(12) United States Patent
Takada et al.

(10) Patent No.: US 6,573,453 B2
(45) Date of Patent: Jun. 3, 2003

(54) WIRING HARNESS AND MANUFACTURING METHOD OF THE SAME

(75) Inventors: Kazuhiko Takada, Shizuoka (JP); Yutaka Matsuoka, Shizuoka (JP); Masami Sakamoto, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/791,836

(22) Filed: Feb. 26, 2001

(65) Prior Publication Data

US 2001/0022233 A1 Sep. 20, 2001

(30) Foreign Application Priority Data

Mar. 14, 2000 (JP) .......................................... 2000-070417

(51) Int. Cl.[7] ................................................ H01B 7/00
(52) U.S. Cl. ..................................... 174/72 A; 439/701
(58) Field of Search ............................... 174/72 A, 145, 174/154; 439/701, 502

(56) References Cited

U.S. PATENT DOCUMENTS

| | | | | |
|---|---|---|---|---|
| 5,759,066 A | * | 6/1998 | Okabe ........................ | 439/598 |
| 5,921,807 A | * | 7/1999 | Okabe ........................ | 439/467 |
| 6,089,892 A | * | 7/2000 | Snow et al. .................. | 174/49 |
| 6,124,548 A | * | 9/2000 | Suzuki et al. ............. | 140/93 R |
| 6,319,071 B1 | * | 11/2001 | Sato ........................... | 439/701 |

FOREIGN PATENT DOCUMENTS

| | | |
|---|---|---|
| JP | 7-296933 | 11/1995 |
| JP | 9-115639 | 5/1997 |
| JP | 10-112229 | 4/1998 |
| JP | 10-154568 | 6/1998 |

* cited by examiner

Primary Examiner—Dean Reichard
Assistant Examiner—Jinhee Lee
(74) Attorney, Agent, or Firm—Armstrong, Westerman & Hattori, LLP

(57) ABSTRACT

The wiring harness has a plurality of first sub-harnesses, a plurality of second sub-harnesses, and a connection portion electrically connecting one of electrical cables of the sub-harnesses to another. The first sub-harness has a first press-fit terminal joined to each end of a first one of the electrical cables, and the first sub-harness has a first isolator holding the first press-fit terminal. The second sub-harness has a second press-fit terminal, a crimp terminal, and a connector housing for accommodating the crimp terminal, and a second isolator supporting the second press-fit terminal. The second press-fit terminal is connected to one end of a second one of the electrical cables, and the crimp terminal is connected to the other end of the second one of the electrical cables. A connection means is provided for connecting one of the press-fit terminal held by one of the first or second isolators to the press-fit terminal held by another of the first or second isolators. The connection portion is completed by the connection means that connects the press-fit terminals held by different isolators to one another when any of the first and second isolators are layered.

8 Claims, 19 Drawing Sheets

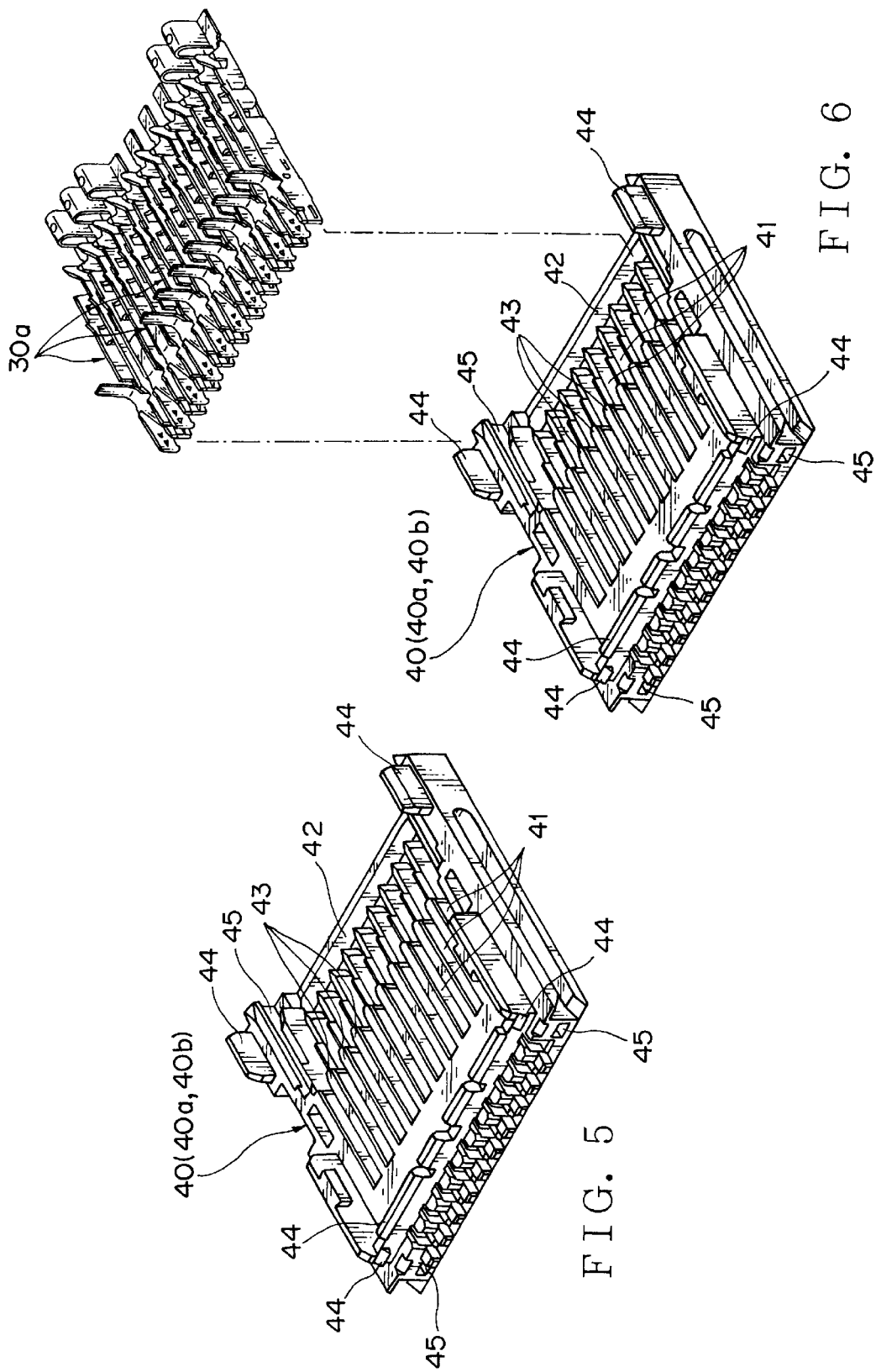

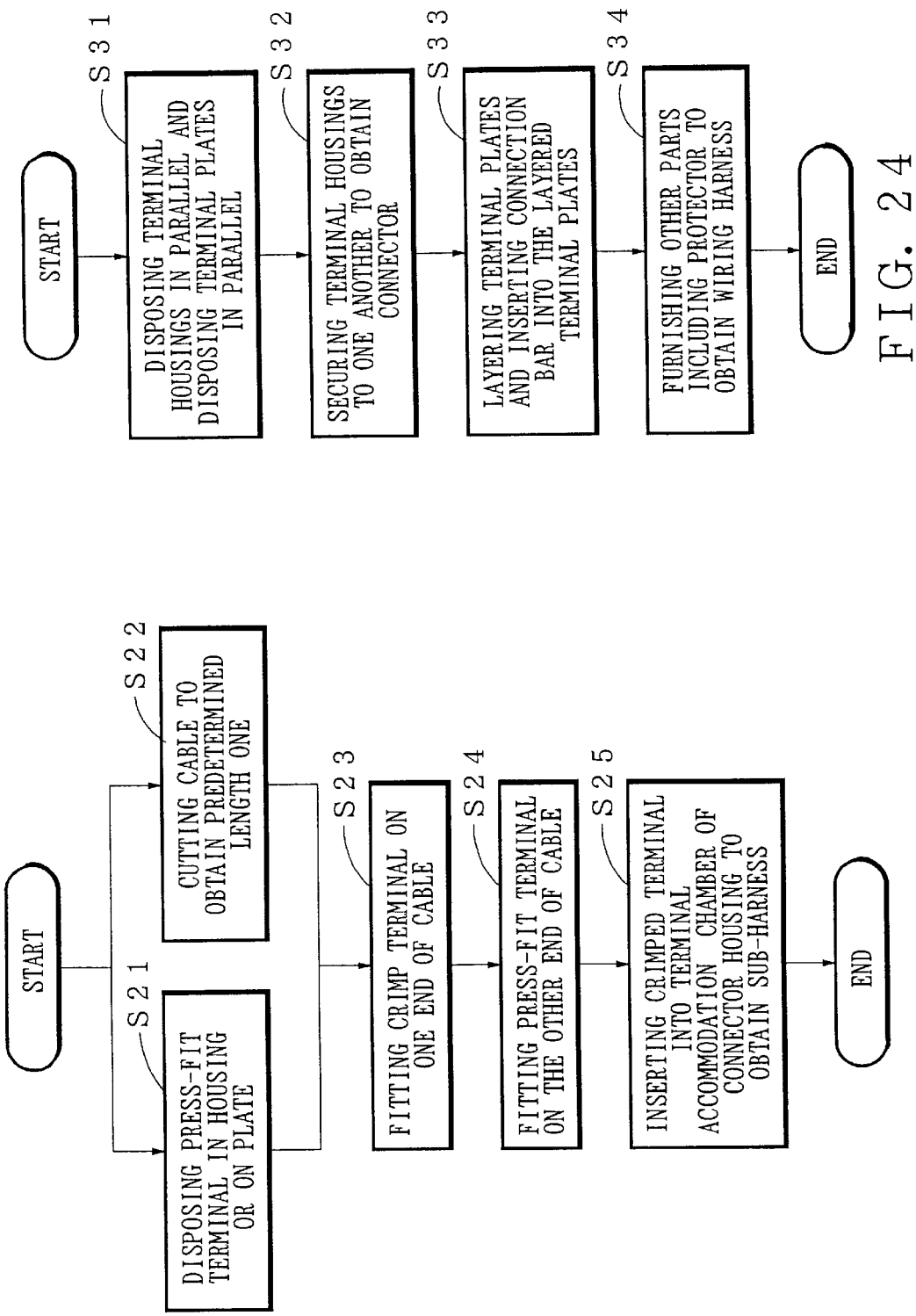

WIRING HARNESS AND MANUFACTURING
METHOD OF THE SAME

BACKGROUND OF THE INVENTION

1. Field of the Invention

The present invention relates to a wiring harness arranged in a mobile unit such as a motor vehicle and also relates to a manufacturing method of the wiring harness.

2. Related Art

A motor vehicle has a wiring harness for supplying power to electrical appliances, such as various lamps and motors, from a battery. A conventional wiring harness includes a plurality of electrical cables, a plurality of terminals each fitted to an end of each electrical cable, connector housings accommodating the terminals, and a connection portion. The electrical cable is an insulated cable having a wire core and an insulating cover.

The connection portion electrically connects the electrical cables to one another. The connection portion directly connects the wire cores of some of the electrical cables to one another.

For example, the connection portion connects one end of the wire core of one electrical cable to one end or a longitudinal middle of the core of another electrical cable. The connection portion connects the wire cores to each other by press-crimping them with a joint terminal or by hot-press-crimping of a resistance welding device.

To obtain the conventional wiring harness, a terminal is fitted to an end of an electrical cable by press-crimping or press-fitting, for example, in the use of a press-fitting unit disclosed in Japanese Patent Application Laid-open No. H. 10-154568 or a press-crimping unit disclosed in Japanese Patent Application Laid-open No. H. 9-115639.

For the connection portion, there has been used a press-crimping machine or a resistance welding device, for example, disclosed in Japanese Patent Application Laid-open No. H. 10-112229. Furthermore, a terminal is inserted into a terminal accommodation chamber of a connector housing to assemble a wiring harness with the use of an insertion device, for example, disclosed in the Application Laid-open No. H. 10-112229.

However, the conventional wiring harness needs to transfer the cables to the press-crimping machine or the resistance welding device for completing the connection portion. The transfer is disadvantageous for an automatic manufacturing method of the wiring harness.

That is, it requires a time and work steps for the transfer of the cables to the press-crimping machine or the resistance welding device and further to the insertion device. This causes a longer manufacturing time of the wiring harness.

Moreover, it also takes an increased time to align the electrical cables for press-crimping or heat-press-crimping them to one another by the press-crimping machine or the resistance welding device to complete the connection portion. Thereby, the conventional wiring harness requires a further increased assembling time, causing a lower productivity thereof.

SUMMARY OF THE INVENTION

In view of the disadvantages, an object of the present invention is to provide a wiring harness and a manufacturing method of the same, in which an improved productivity is allowed.

For achieving the object, a first aspect of the present invention is a wiring harness having a plurality of electrical cables and a connection portion electrically connecting one of the electrical cables to another of the electrical cables. The wiring harness includes:

a plurality of sub-harnesses each having at least one press-fit terminal and an isolator supporting the press-fit terminal, the press-fit terminal being joined to an end of one of the electrical cables, and a connection means for connecting the press-fit terminals held by different ones of the isolators to ones another.

The connection portion is defined by the connection means that connects the press-fit terminals held by different ones of the isolators to one another when the isolators are layered.

A second aspect of the present invention is a wiring harness having a plurality of electrical cables and a connection portion electrically connecting one of the electrical cables to another of the electrical cables. The wiring harness includes:

a plurality of first sub-harnesses each having a first press-fit terminal joined to each end of a first one of the electrical cables, the first sub-harness having a first isolator holding the first press-fit terminal, a plurality of second sub-harnesses each having a second press-fit terminal, a crimp terminal, and a connector housing for accommodating the crimp terminal, and a second isolator supporting the second press-fit terminal, the second press-fit terminal being connected to one end of a second one of the electrical cables, the crimp terminal being connected to the other end of the second electrical cable, and a connection means for connecting the press-fit terminal held by one of the first or second isolators to the press-fit terminal held by another of the first or second isolators.

The connection portion is completed by the connection means that connects the press-fit terminals held by different ones of the isolators to one another when any of the first and second isolators are layered.

A third aspect of the present invention is a wiring harness having a plurality of electrical cables and a connection portion electrically connecting one of the electrical cables to another of the electrical cables. The wiring harness includes:

a plurality of first sub-harnesses each having a first press-fit terminal joined to each end of one of the electrical cables, the first sub-harness having a first isolator supporting the first press-fit terminal, and a connection means for connecting one of the press-fit terminals held by one of the first isolators to the press-fit terminal held by another of the first isolators.

The connection portion is defined by the connection means that connects the press-fit terminals held by different ones of the isolators to one another when any of the isolators are layered.

A fourth aspect of the present invention is a wiring harness having a plurality of electrical cables and a connection portion electrically connecting one of the electrical cables to another of the electrical cables. The wiring harness includes:

a plurality of sub-harnesses each having a press-fit terminal, a crimp terminal, a connector housing for accommodating the crimp terminal, and a second isolator holding the press-fit terminal, the press-fit terminal being connected to an end of one of the electrical cables, the crimp terminal being connected to the other end of the one of the electrical cables, and a connection means for connecting the press-fit terminal held by one of the isolators to the press-fit terminal held by another of the isolators.

The connection portion is defined by the connection means that connects the press-fit terminals held by different ones of the isolators to one another when the isolators are layered.

A fifth aspect of the present invention is a manufacturing method of a wiring harness having a plurality of first sub-harnesses, a plurality of second sub-harnesses, and a connection means. Each of the first sub-harnesses has a plurality of first electrical cables, a first press-fit terminal joined to each end of each of the first electrical cables, and a first isolator holding the first press-fit terminals. Each of the second sub-harnesses has a plurality of second electrical cables, a second press-fit terminal joined to one end of each of the second electrical cables, a crimp terminal joined to the other end of each of the second electrical cables, a connector housing receiving the crimp terminals, and a second isolator holding the second press-fit terminals. The connection means connects the press-fit terminals to one another when any of the first and second isolators are layered. The manufacturing method includes the steps of:

a first sub-harness assembling step, a second sub-harness assembling step, and a wiring harness assembling step, wherein any of the first and second isolators of the first and second sub-harnesses are layered, while the connection means connects the press-fit terminals held by different ones of the isolators to one another.

Preferably, the first sub-harness assembling step includes:

a first step for holding the first press-fit terminal by the first isolator, a second step for cutting a long electrical cable to obtain the first electrical cable having a predetermined length, and a third step for press-fitting the first press-fit terminal to each end of the first electrical cable.

Preferably, the second sub-harness assembling step includes:

a fourth step for holding the second press-fit terminal by the second isolator, a fifth step for cutting a long electrical cable to obtain the second electrical cable having a predetermined length, a sixth step for press-crimping the crimp terminal to the other end of the second the electrical cable, a seventh step for press-fitting the second press-fit terminal to the one end of the second electrical cable, and an eighth step for inserting the crimp terminal into a terminal accommodation chamber of the connector housing.

Preferably, the wire harness assembling step includes:

a ninth step for disposing any of the first and second isolators to be parallel to one another with a space therebetween, and a tenth step for layering the parallel disposed isolators to connect the press-fit terminals held on different ones of the isolators to one another by the connection means.

In the first to fourth aspects of the present invention, the connection portion is defined by layering any of the isolators so that the press-fit terminals held by the different isolators are electrically connected to one another. Thus, the connection portion is defined without directly jointing the wire cores of the different electrical cables.

In the fifth aspect of the present invention, the wiring harness assembling step layers any of the first and second isolators to electrically connect the electrical cables to one another, which defines the connection portion. Thus, the connection portion is defined without directly jointing the wire cores of the different electrical cables.

In the first sub-harness assembling step and the second sub-harness assembling step, the wire cores of the electrical cables are not directly connected.

In the sixth aspect of the present invention, the third step fits the first press-fit terminal held by the first isolator to each end of the first the electrical cable to obtain the first sub-harness. In the first sub-harness assembling step, the wire cores of the electrical cables are not directly connected.

In the seventh aspect of the present invention, the second press-fit terminal held by the second isolator is fitted to the first end of the second electrical cable. The crimp terminal crimped to the second end of the second the electrical cable is inserted into the terminal accommodation chamber of the connector housing to obtain the second sub-harness. Thus, in the first sub-harness assembling step, the wire cores of the electrical cables are not directly connected.

In the eighth aspect of the present invention, the press-fit terminals held by the layered isolators are electrically connected to one another to complete the wiring harness. That is, the layering of the isolators connects the electrical cables to each other. Thus, the connection portion is defined without directly jointing the wire cores of the different electrical cables.

Next, advantageous effects of the present invention will be described.

In the aforementioned aspects of the invention, it is not required to directly connect the wire core of one of the electrical cables to that of another to define the connection portion. That is, the connection portion is defined without a press-crimping machine and a resistance welding device. Accordingly, the press-fit terminals need not be moved from main production lines of the sub-harness assembling to the press-crimping machine and the resistance welding device. This requires no increased production time, keeping a sufficient productivity.

BRIEF DESCRIPTION OF THE DRAWINGS

FIG. 5 is a perspective view showing a terminal fitting housing of the wiring harness of FIG. 1;

FIG. 6 is a perspective view showing the terminal fitting housing of FIG. 5 and press-fit terminals used in a joint connector, which are just going to be inserted into the housing;

FIG. 23 is a flow chart showing a second sub-harness assembling step of the wiring harness manufacturing method of FIG. 21;

FIG. 24 is a flow chart showing a wiring harness assembling step of the wiring harness manufacturing method of FIG. 21;

DETAILED DESCRIPTION OF THE PREFERRED EMBODIMENT

Referring to FIGS. 1 to 20, a wiring harness 1 of an embodiment of the present invention will be discussed hereinafter. The wiring harness 1 illustrated in FIG. 1 is arranged in a motor vehicle to supply power from a power source, like a battery, to on-vehicle electric appliances, such as various lamps and various motors.

Figure 1:
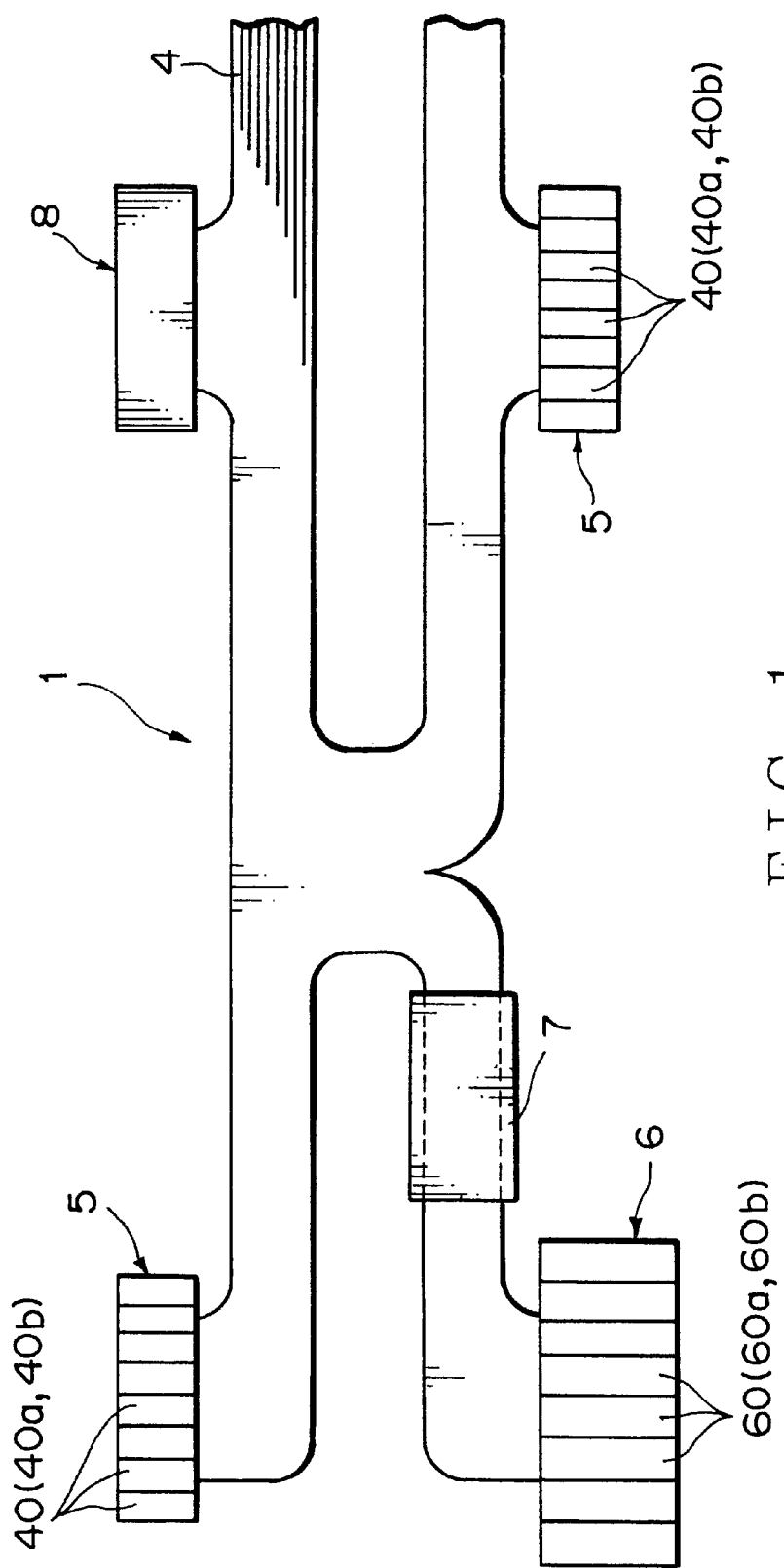
FIG. 1 is a view illustrating a concept of a wiring harness of an embodiment according to the present invention.

The wiring harness 1, as illustrated in FIG. 1, has a plurality of electrical cables 4, connectors 5, a power distribution line unit 6, a connector 8, and other fittings like a protector 7. Each electrical cable 4 is an insulated one having a conductive wire core and an insulating sheath that covers the core. A plurality of the protectors 7 are provided at appropriate positions to adequately secure the electrical cables 4.

Figure 16:
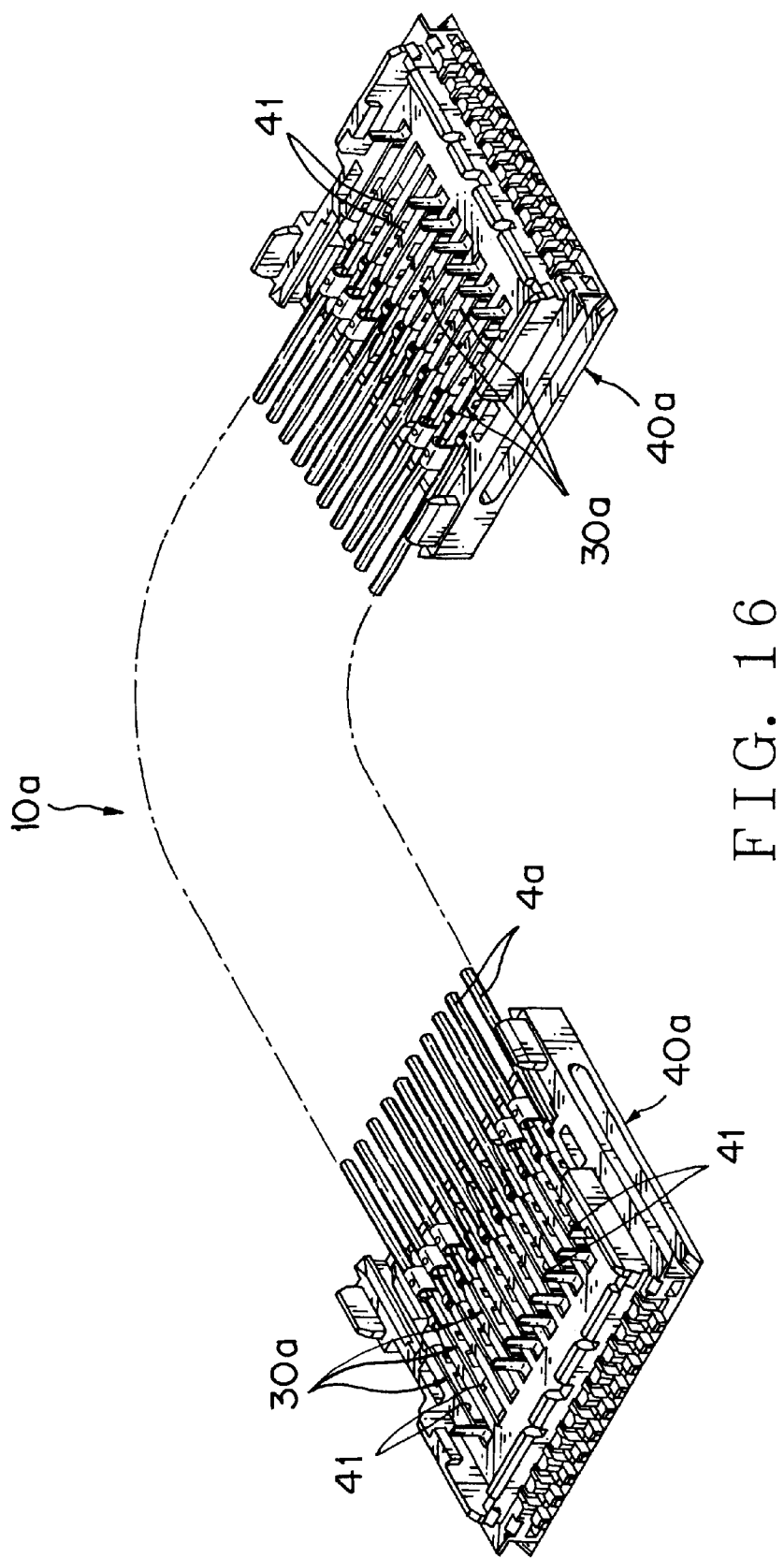
FIG. 16 is a perspective view showing an example of a sub-harness of the wiring harness shown in FIG. 1, and the sub-harness has a press-fit terminal at each end thereof.
Figure 17:
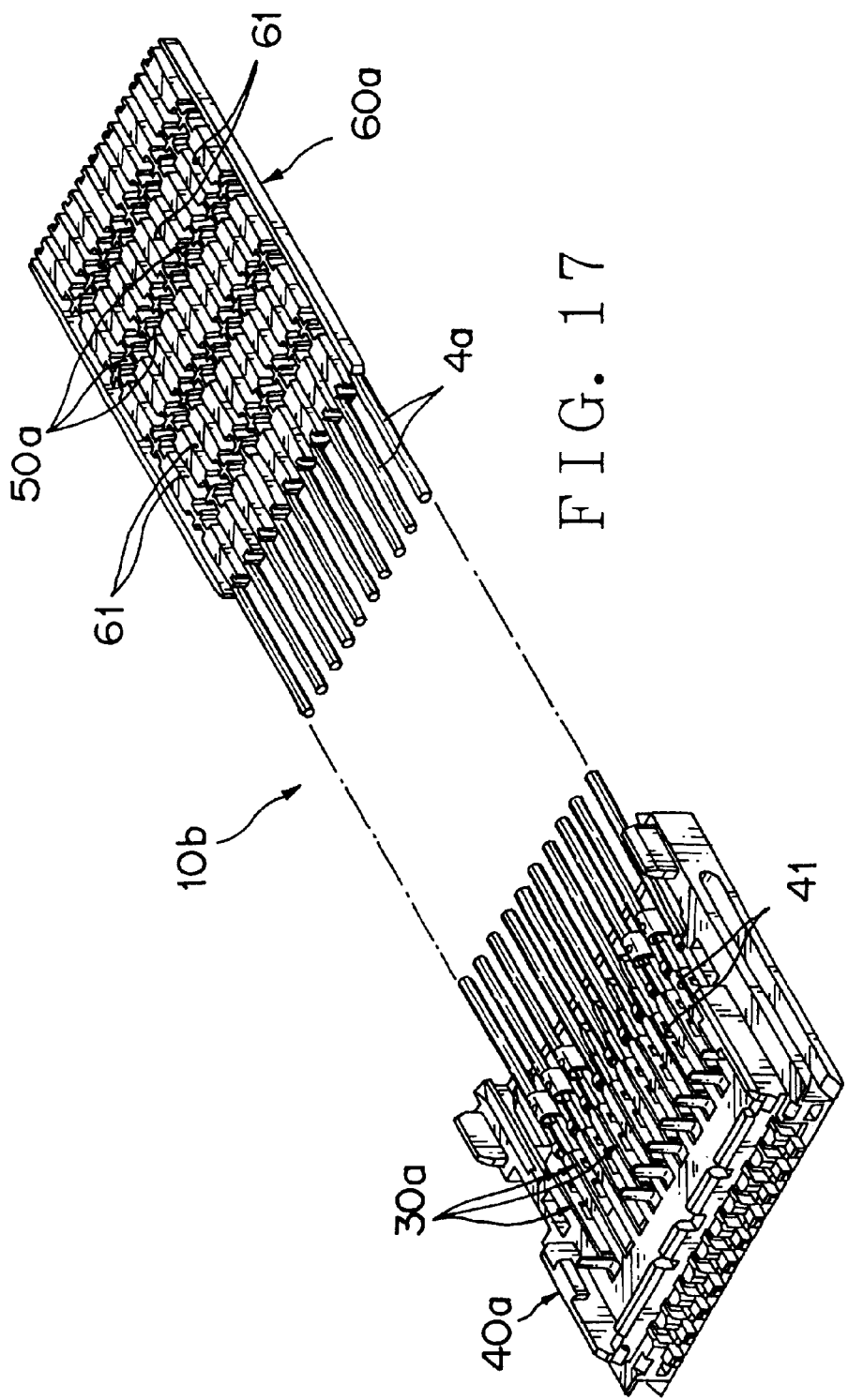
FIG. 17 is a perspective view showing another example of a sub-harness of the wiring harness shown in FIG. 1, and the sub-harness has a press-fit terminal at each end thereof.
Figure 18:
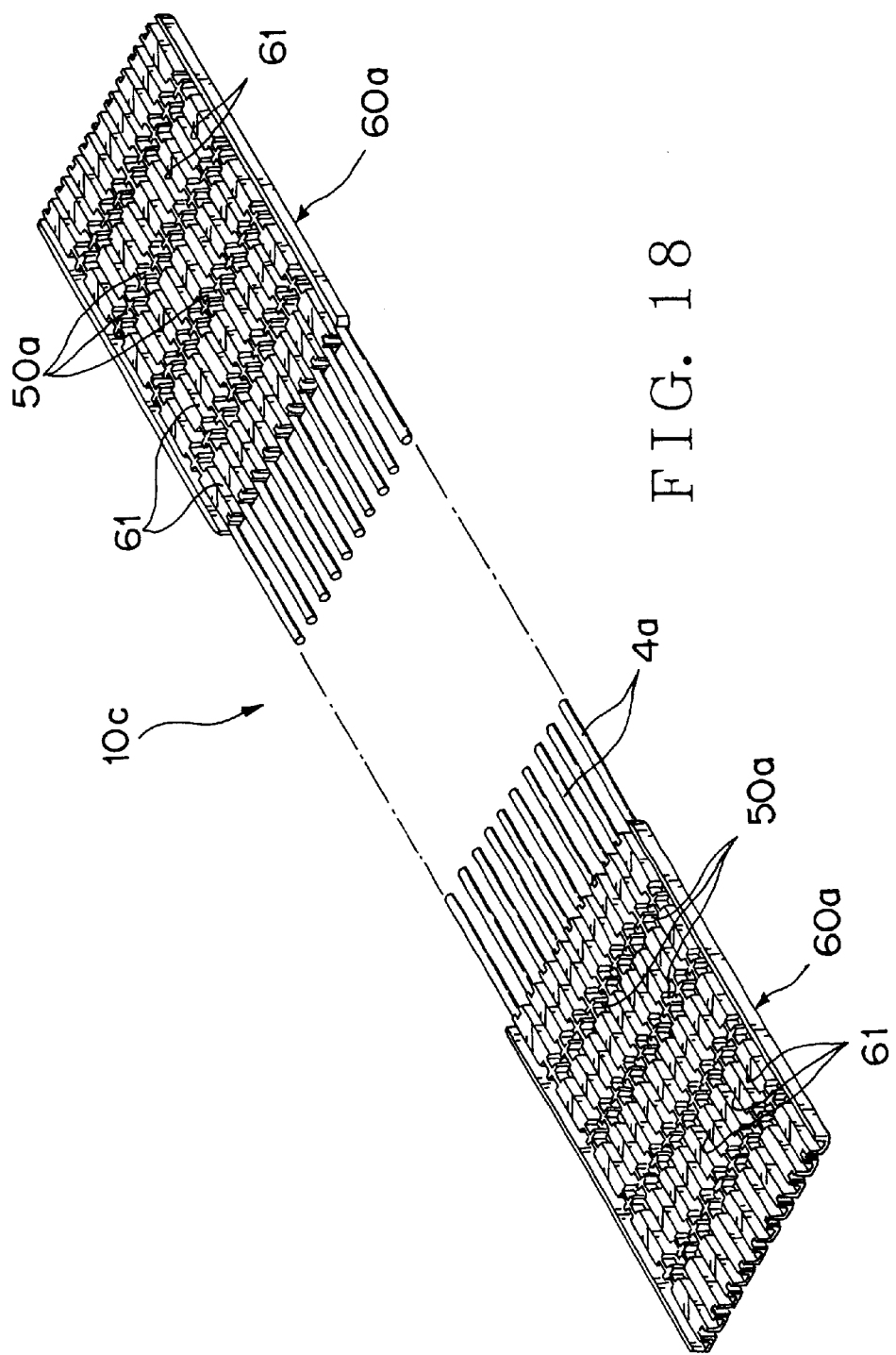
FIG. 18 is a perspective view showing another example of a sub-harness of the wiring harness shown in FIG. 1, and the sub-harness has a press-fit terminal at each end thereof.

The wiring harness 1 has at least one type of sub-harness freely selected from sub-harnesses 10a, 10b, 10c each having a press-fit terminal 30a at each end as illustrated in FIGS. 16 to 18. The wiring harness 1 may have more than one of the sub-harnesses 10a, 10b, 10c.

That is, the wiring harness 1 may have any of the sub-harnesses 10a, 10b, 10c.

Figure 19:
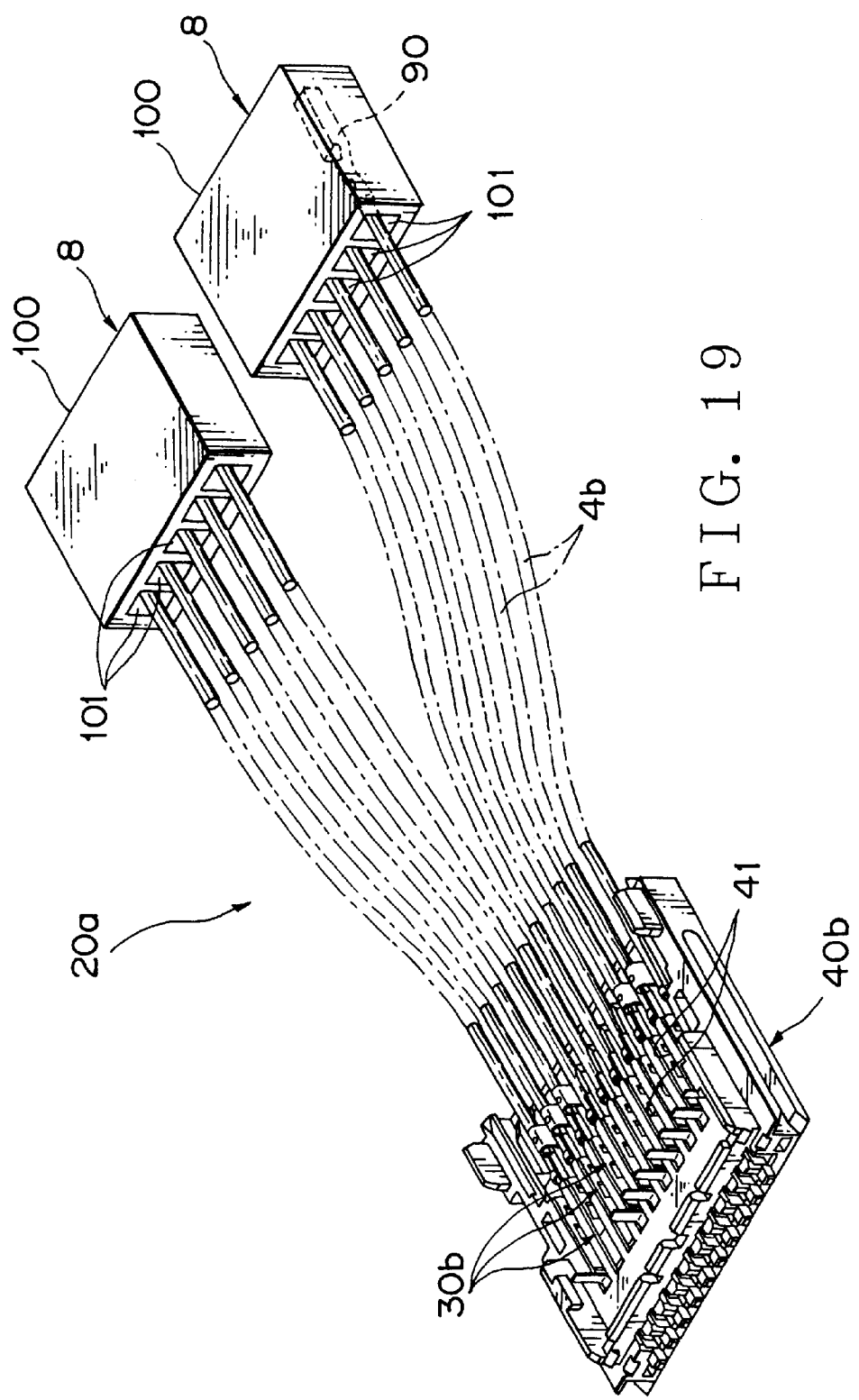
FIG. 19 is a perspective view showing an example of a sub-harness of the wiring harness shown in FIG. 1, and the sub-harness has a press-fit terminal at one end and a crimp terminal at the other end.
Figure 20:
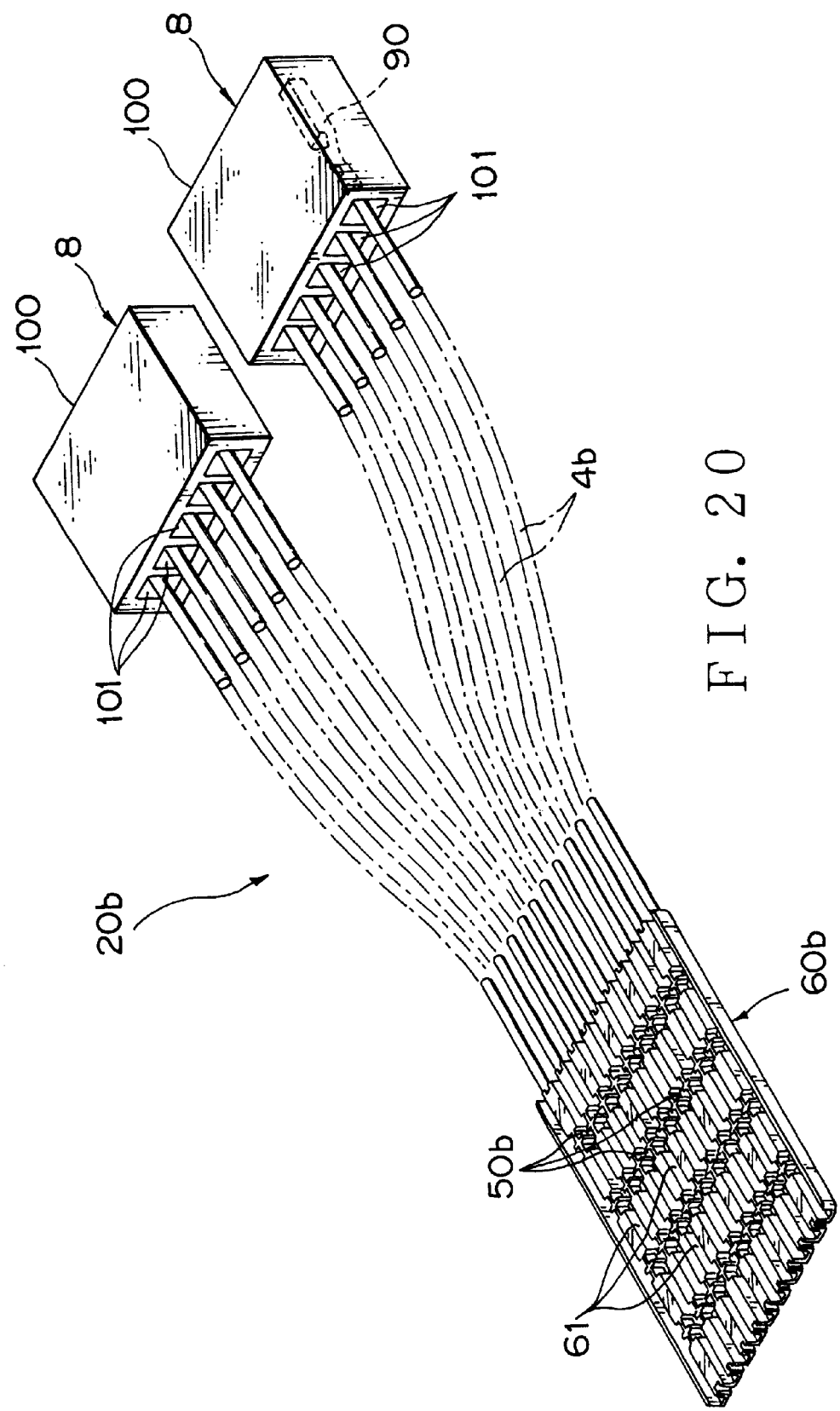
FIG. 20 is a perspective view showing another example of a sub-harness of the wiring harness shown in FIG. 1, and the sub-harness has a press-fit terminal at one end and a crimp terminal at the other end.

Alternatively, the wiring harness 1 may have one or more of sub-harnesses 20a, 20b each having a press-fit terminal identified generally by reference numeral 30, or specifically with an appropriate suffix "a" or "b", at one end and a crimp terminal at the other end as illustrated in FIGS. 19 and 20. Alternatively, the wiring harness 1 may have one or more of the sub-harnesses 10a, 10b, 10c and one or more of the sub-harnesses 20a, 20b.

The wiring harness 1 is generally completed by incorporating the sub-harnesses 10a, 10b, 10c with the sub-harnesses 20a, 20b as described later. Note that each sub-harness 10a, 10b, or 10c corresponds to a first sub-harness described in the summary of the invention, and each sub-harness 20a or 20b corresponds to a second sub-harness.

Figure 2:
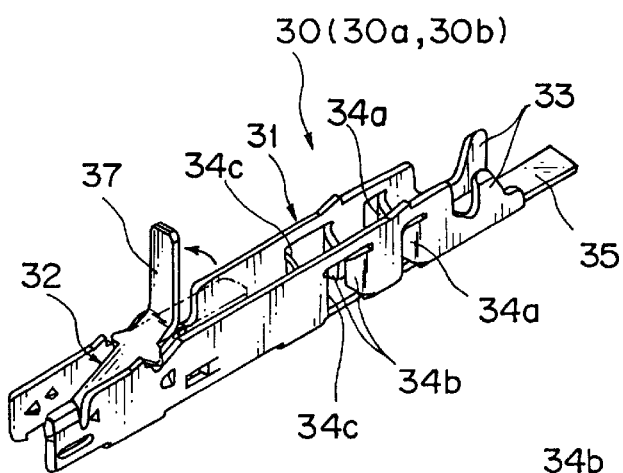
FIG. 2 is a perspective view of a press-fit terminal used in a joint connector of the wiring harness of the embodiment.
Figure 3:
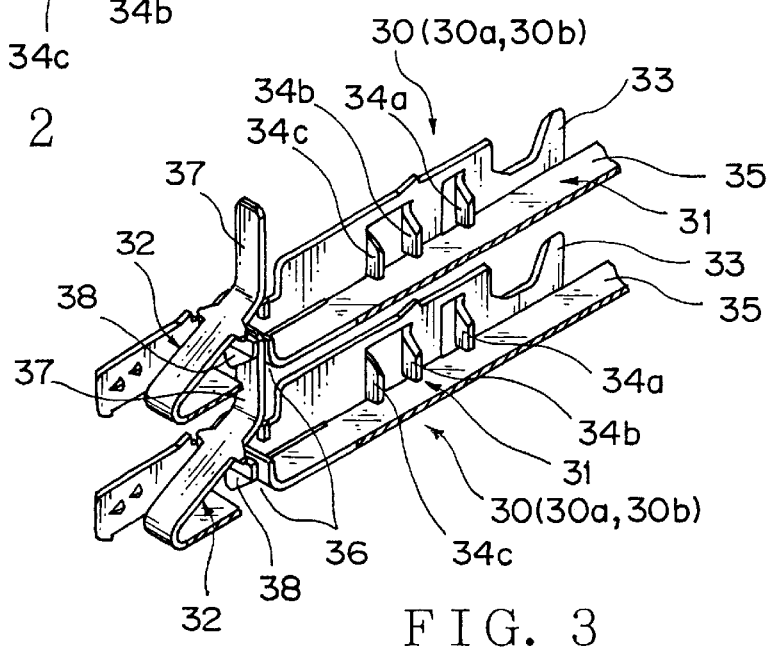
FIG. 3 is a perspective view showing two of the press-fit terminals of FIG. 2, the terminals being layered to electrically connect to each other.
Figure 4:
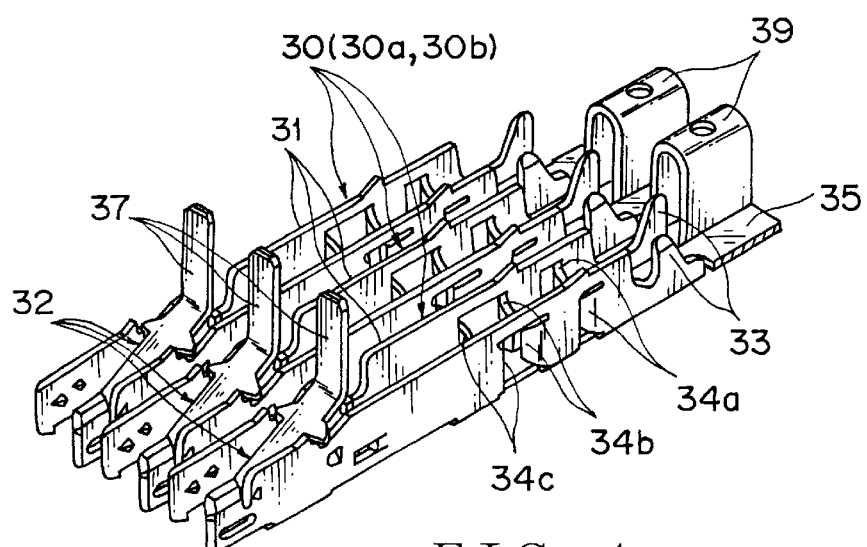
FIG. 4 is a perspective view showing some of the press-fit terminals of FIG. 2, the terminals being disposed in parallel to electrically connect to each other.
Figure 7:
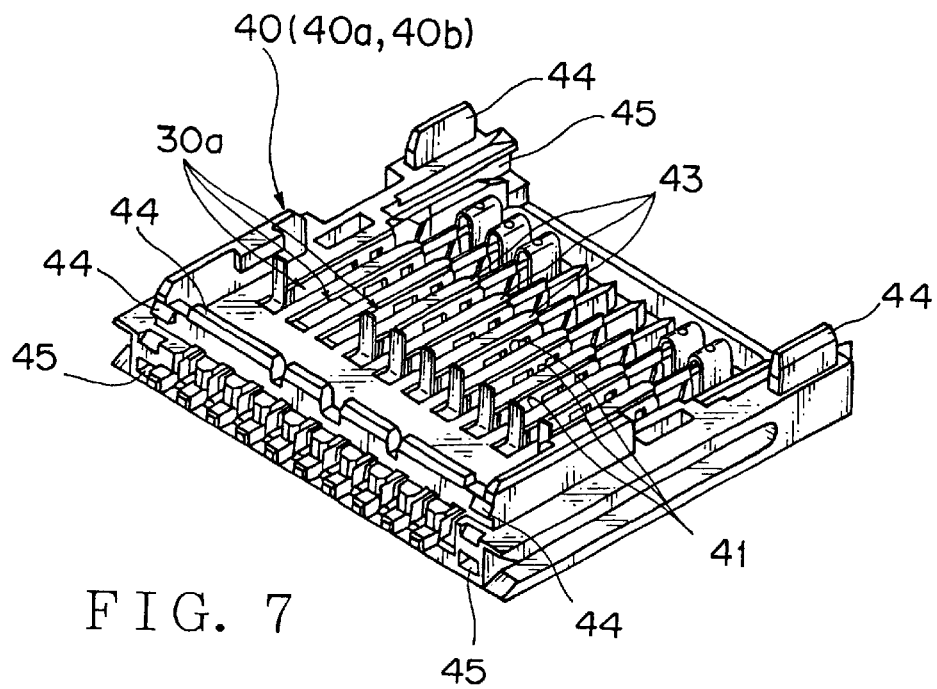
FIG. 7 is a perspective view showing the terminal fitting housing of FIG. 5 and the press-fit terminals of the joint connector which have been inserted into the housing.

The sub-harness 10a illustrated in FIG. 16 has a parallel row of electrical cables 4a, press-fit terminals 30 for a joint connector, and terminal fitting housings 40. Note that reference numeral 30a designates a press-fit terminal associated with the sub-harness 10a or 10b, and reference numeral 40a designates a terminal fitting housing associated with the sub-harness 10a or 10b. The press-fit terminal 30a is illustrated in FIGS. 2 to 4, and the terminal fitting housing that is an isolator is illustrated in FIGS. 5 to 10.

The press-fit terminals 30a in FIG. 16 are fitted to each end of the electrical cable 4a. Each press-fit terminal 30a is received in a terminal accommodation chamber 41, which will be discussed later, of the terminal fitting housing 40a.

Figure 11:
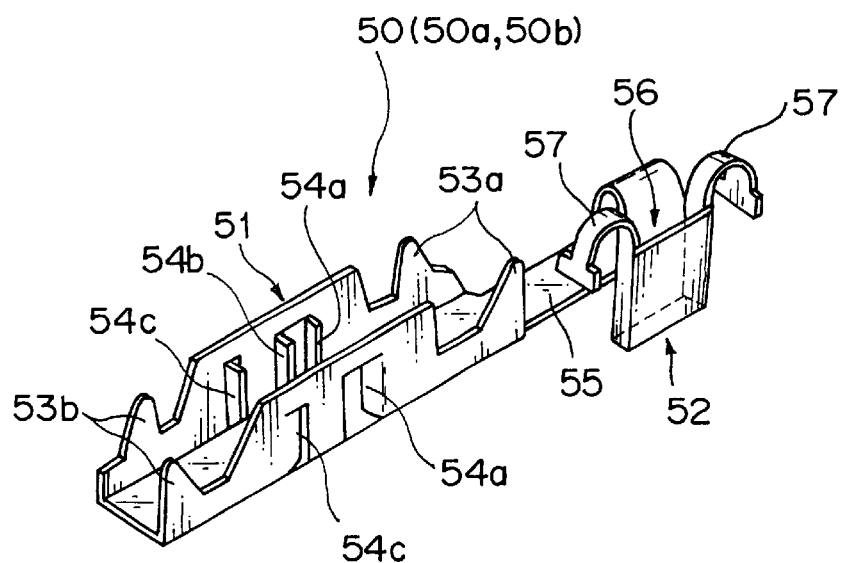
FIG. 11 is a perspective view showing a press-fit terminal used in a junction-box of a wiring harness of FIG. 1.
Figure 13:
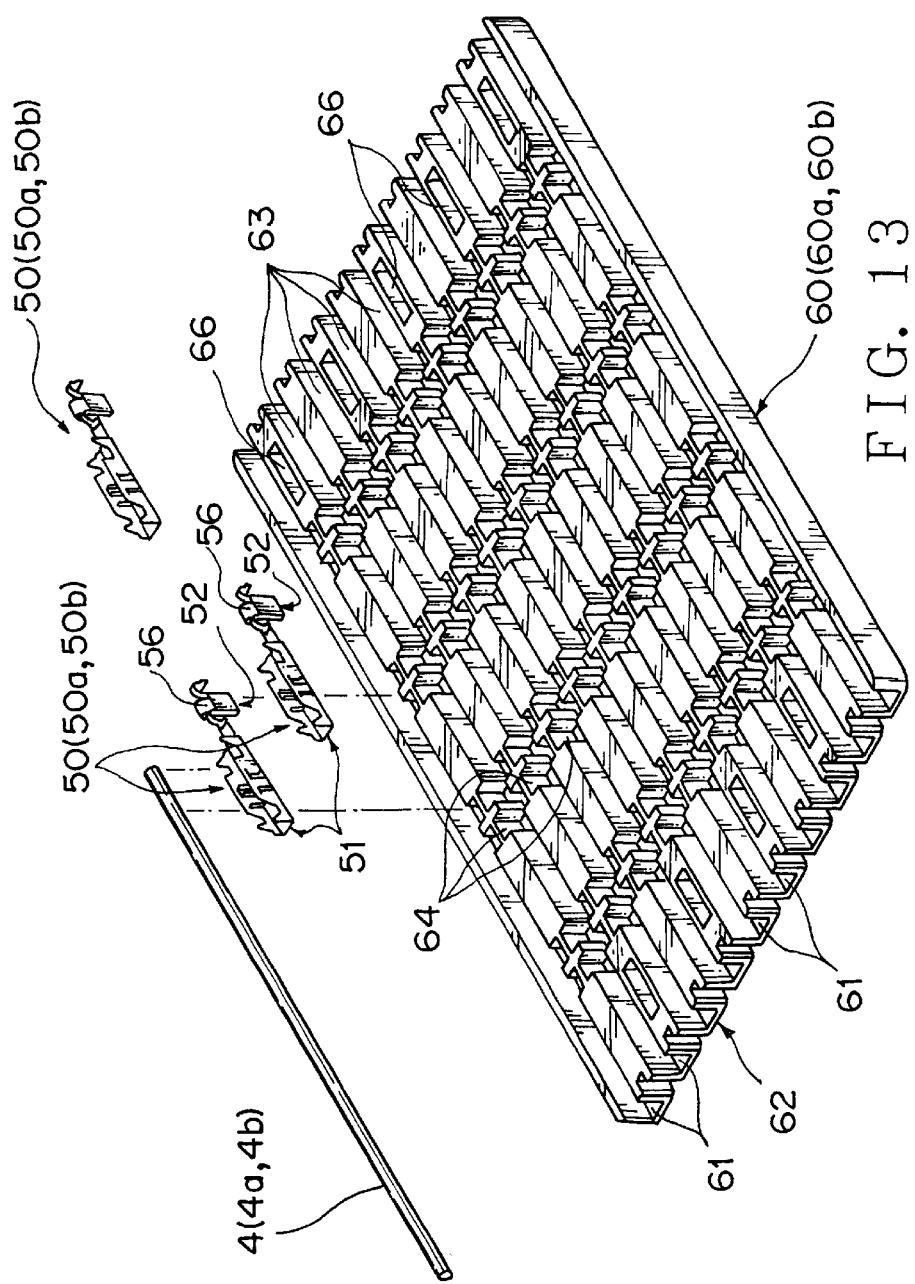
FIG. 13 is a perspective view showing a terminal fitting plate of the wiring harness embodying the present invention and showing in-junction-box disposed press-fit terminals and electrical cables received in the terminal fitting plate.
Figure 12:
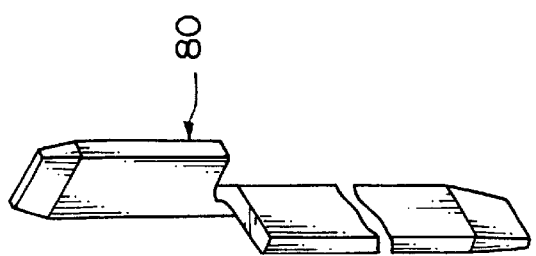
FIG. 12 is a perspective view showing a joint bar of the wiring harness of FIG. 1.
Figure 14:
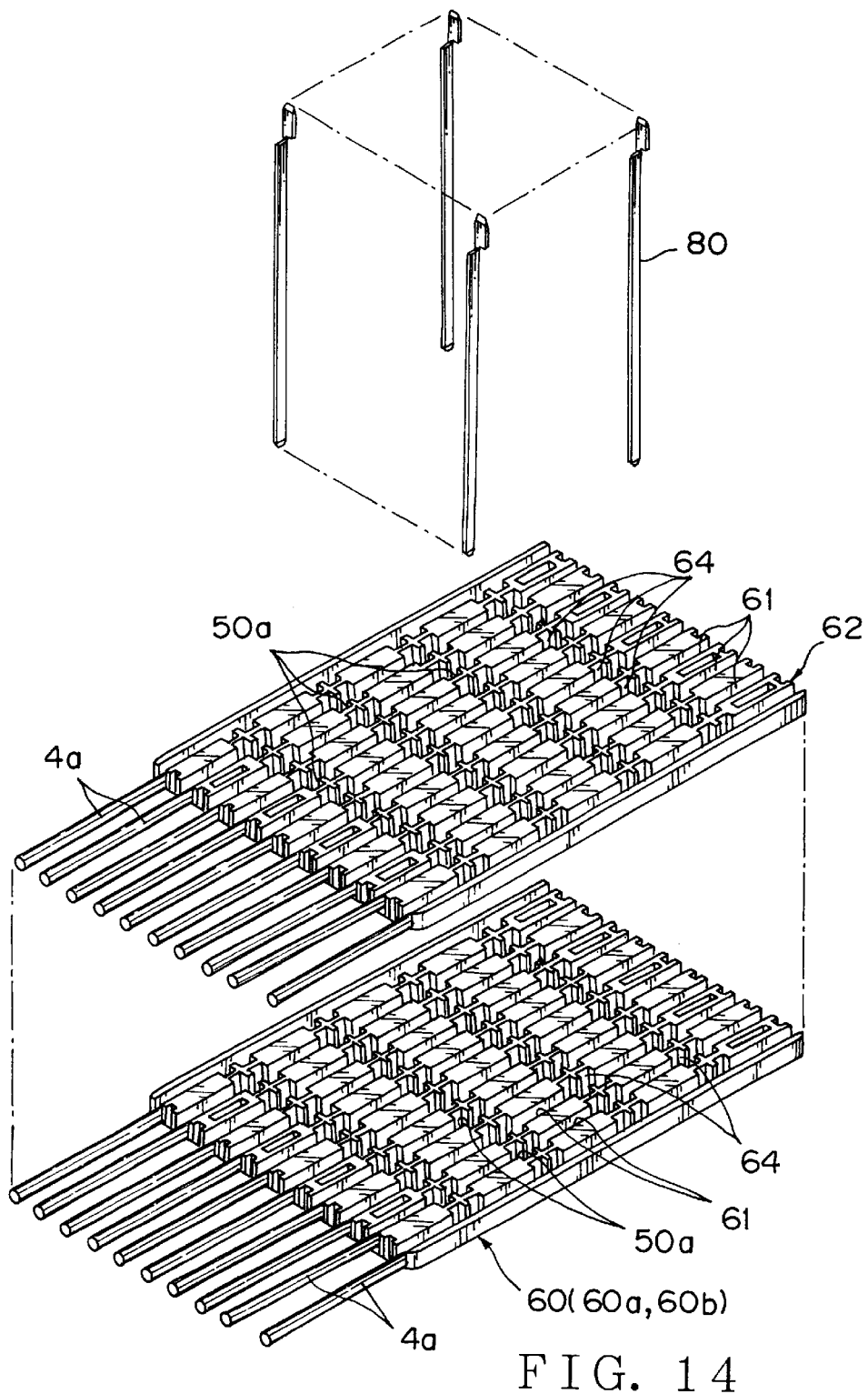
FIG. 14 is a perspective view showing two of the terminal fitting plates of FIG. 13 which are layered with a space therebetween.
Figure 15:
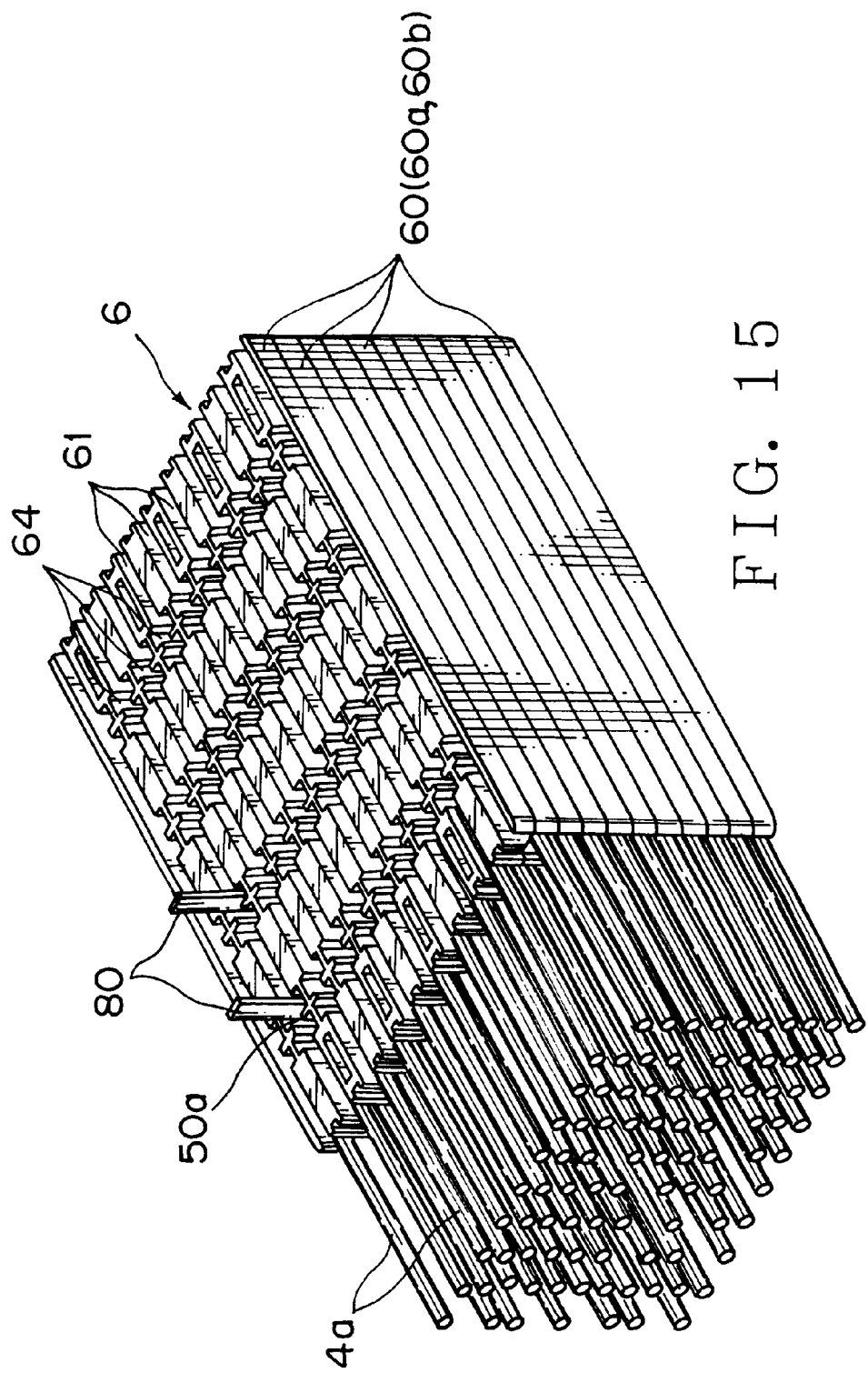
FIG. 15 is a perspective view showing a power distribution line unit defined by securing the terminal fitting plates of FIG. 13 to one another.

The sub-harness 10b illustrated in FIG. 17 has a parallel row of electrical cables 4a, press-fit terminals 30a for a joint connector, a press-fit terminal housing 40a, press-fit terminals 50 for a junction box, and terminal fitting plates 60a. Note that reference numeral 50a designates a press-fit terminal associated with the sub-harness 10b or 10c. The press-fit terminal 30a is also illustrated in FIG. 11, and the terminal fitting plate 60 is also illustrated in FIGS. 13 to 15.

The in-junction-box press-fit terminals 30a each are fitted to the ends of the electrical cables 4a. Each press-fit terminal 30a is received in the terminal accommodation chamber 41 of the terminal fitting housing 40a. The in-junction-box press-fit terminal 50a is fitted to the other end of the electrical cables 4a. The press-fit terminals 50a each are received in an electrical cable accommodation chamber 61, which will be discussed later, of the terminal fitting plate 60a.

The sub-harness 10c illustrated in FIG. 18 has a parallel row of electrical cables 4a, press-fit terminals 50a for a junction box, and terminal fitting plates 60a. The press-fit terminal 50a is fitted to each end of the electrical cables 4a. The press-fit terminal 50a is received in an electrical cable accommodation chamber 61 of the terminal fitting plate 60a.

In the examples illustrated in FIGS. 16 to 18, the electrical cables 4a each are fitted to the terminal fitting housing 40a or to the terminal fitting plate 60a at each end thereof. However, the sub-harness 10a, 10b, or 10c may have a plurality of the terminal fitting housings 40a or the terminal fitting plates 60a at each end side of the electrical cables 4a.

The electrical cable 4a of the sub-harnesses 10a, 10b, 10c corresponds to the first electrical cable described in the summary of the invention. The press-fit terminal 30a and the press-fit terminal 50a of the sub-harnesses 10a, 10b, 10c correspond to the first press-fit terminals described in the invention summary. The terminal fitting housing 40a and the terminal fitting plate 60a of the sub-harnesses 10a, 10b, 10c correspond to the first isolators described in the invention summary.

The sub-harness 20a illustrated in FIG. 19 has a parallel row of electrical cables 4b, press-fit terminals 30b for a junction box, terminal fitting housings 40b, crimp terminals 90, and connector housings 100. The terminal fitting housing 40b functions as an isolator.

Each press-fit terminal 30b is fitted to an end of each electrical cable 4b. The press-fit terminal 30b is received in a terminal accommodation chamber 41 of the terminal fitting housing 40b. The crimp terminal 90 is defined by bending a conductor plate. The crimp terminal 90 is crimped to the other end of the electrical cable 4b.

The connector housing 100 is made of an insulating synthetic resin material and has a box shape. The connector housing 100 has a plurality of terminal accommodation chambers 101 receiving the crimp terminals 90. The terminal accommodation chamber 101 of the connector housing 100 receives the crimp terminal 90 crimped to the other end of the electrical cable 4b. The connector housing 100 and the crimp terminals 90 received in the terminal accommodation chambers 101 constitute the connector 8.

The sub-harness 20b illustrated in FIG. 20 has a parallel row of electrical cables 4b, press-fit terminals 50b for a junction box, a terminal fitting plate 60b that functions as an isolator, crimp terminals 90, and a connector housing 100.

Each press-fit terminal 50b is fitted to an end of each electrical cable 4b. The press-fit terminal 50b is received in an electrical cable accommodation chamber 61 of the terminal fitting plate 60b. A crimp terminal 90 and a connector housing 100, which are illustrated in FIG. 20, are the same as those of the sub-harness 20a. Thus, the same reference numerals are provided for them not to be discussed again.

In the examples illustrated in FIG. 19 and FIG. 20, the electrical cables 4b are fitted to the terminal fitting housing 40a or the terminal fitting plate 60a at an end side thereof, while the electrical cables 4b are fitted to two separate connectors 8 at the other end side thereof.

Alternatively, the sub-harness 20a or 20b of the wiring harness 1 may have one or more connectors 8 at the other end side of the electrical cables 4b.

The electrical cable 4b of the sub-harnesses 20a, 20b corresponds to the second electrical cable described in the invention summary. The press-fit terminal 30b and the press-fit terminal 50b for a junction-box of the sub-harness 20a, 20b correspond to the second press-fit terminals described in the invention summary. The terminal fitting housing 40b and the terminal fitting plate 60b of the sub-harness 20a, 20b each correspond to the second isolator described in the invention summary.

Since press-fit terminals 30a, 30b have the same configuration as each other, only the press-fit terminal 30a will be representatively discussed. The press-fit terminal 30a is defined by bending a conductor plate. The press-fit terminal 30a, as illustrated in FIGS. 2 and 3, has a flat bottom wall 35 on which an electrical cable 4a is disposed, an electrical cable connection portion 31, and an electrical contact piece 32.

The electrical cable connection portion 31 has a pair of opposing crimping pieces 33 and three pairs of press fitting blades 34a, 34b, 34c. The crimping pieces 33 and the press fitting blades 34a, 34b, 34c are vertically extending relative to the bottom wall 35.

The crimping pieces 33 are bent to hold the electrical cable 4a disposed on the bottom wall 35. The press fitting blades 34a, 34b, 34c receive the electrical cable 4a which is inserted between each pair of the blades. Thereby, the blades cut into the sheath of the electrical cable 4a to contact the wire core to electrically connect to the electrical cable 4a. That is, the press-fitting of the blades with the electrical cable 4a is completed.

The electrical contact piece 32 has an opening 36 (see FIG. 3) provided in the bottom wall 35 and has a contact piece 37 raised from the bottom wall 35 and serving as a connection means. The contact piece 37 is changeable from a rising position to a parallel position relative to the bottom wall 35 by a bending work. The parallel position is illustrated by a chain line in FIG. 2.

Note that the contact piece 37 permanently maintains a rising position or a parallel position once the position is determined. The opening 36, as illustrated in FIG. 3, has a resilient contact piece 38 for press-fitting the contact piece 37 to an end of the bottom wall 35.

The press-fit terminals 30a for a joint connector are layered with a space therebetween in parallel to the bottom wall 35. The electrical contact piece 32 electrically connects the press-fit terminals 30a to one another, since the contact piece 37 of the press-fit terminal 30a is inserted into the opening 36 of another upper press-fit terminal 30a as illustrated in FIG. 3.

At the same time, the contact piece 37 of the lower press-fit terminal 30a is pinched between an end part of the bottom wall 35 and the resilient contact piece 38 of the upper press-fit terminal 30a.

The press-fit terminals 30a, as illustrated in FIG. 6, are forced into terminal accommodation chambers 41 of a terminal fitting housing 40a. Thereby, the press-fit terminals 30a are received in the terminal fitting housing 40a to be secured therein.

When received in the terminal accommodation chambers 41, the press-fit terminals 30a are disposed in parallel to one another. Adjacent two of the press-fit terminals 30a each have a connection piece 39 to electrically connect each other as illustrated in FIG. 4. The connection piece 39 is provided in the side of the electrical cable connection portion 31 of the bottom wall 35.

Since the terminal fitting housings 40a, 40b have the same configuration as each other, only the terminal fitting housing 40a will be representatively discussed. The terminal fitting housing 40a is made of an insulating synthetic resin material or the like. The terminal fitting housing 40a, as illustrated in FIGS. 5 to 10, has a rectangular plate-like main body 42, a plurality of partitions 43 rising from the main body 42, and a plurality of terminal accommodation chambers 41. The partitions 43 are parallel to one another and define the terminal accommodation chambers 41 between them.

Figure 8:
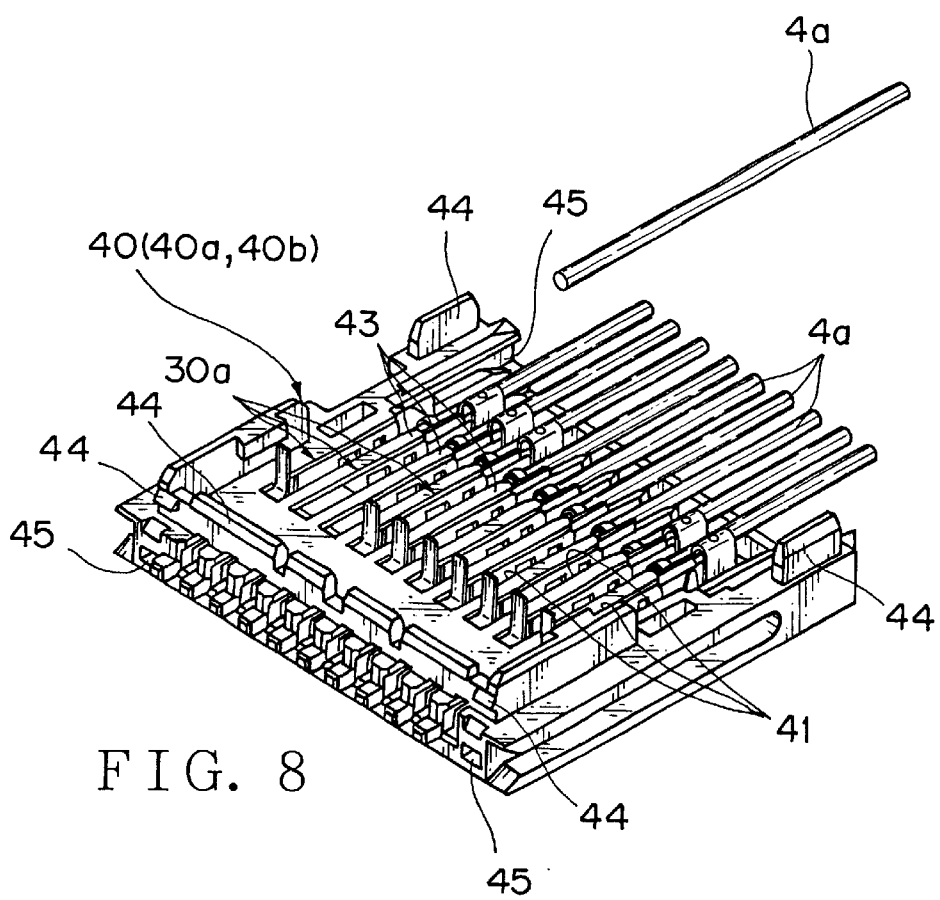
FIG. 8 is a perspective view showing the terminal fitting housing of FIG. 7 which has received the in-joint-connector disposed press-fit terminals in which electric cables are inserted to be secured therein.
Figure 9:
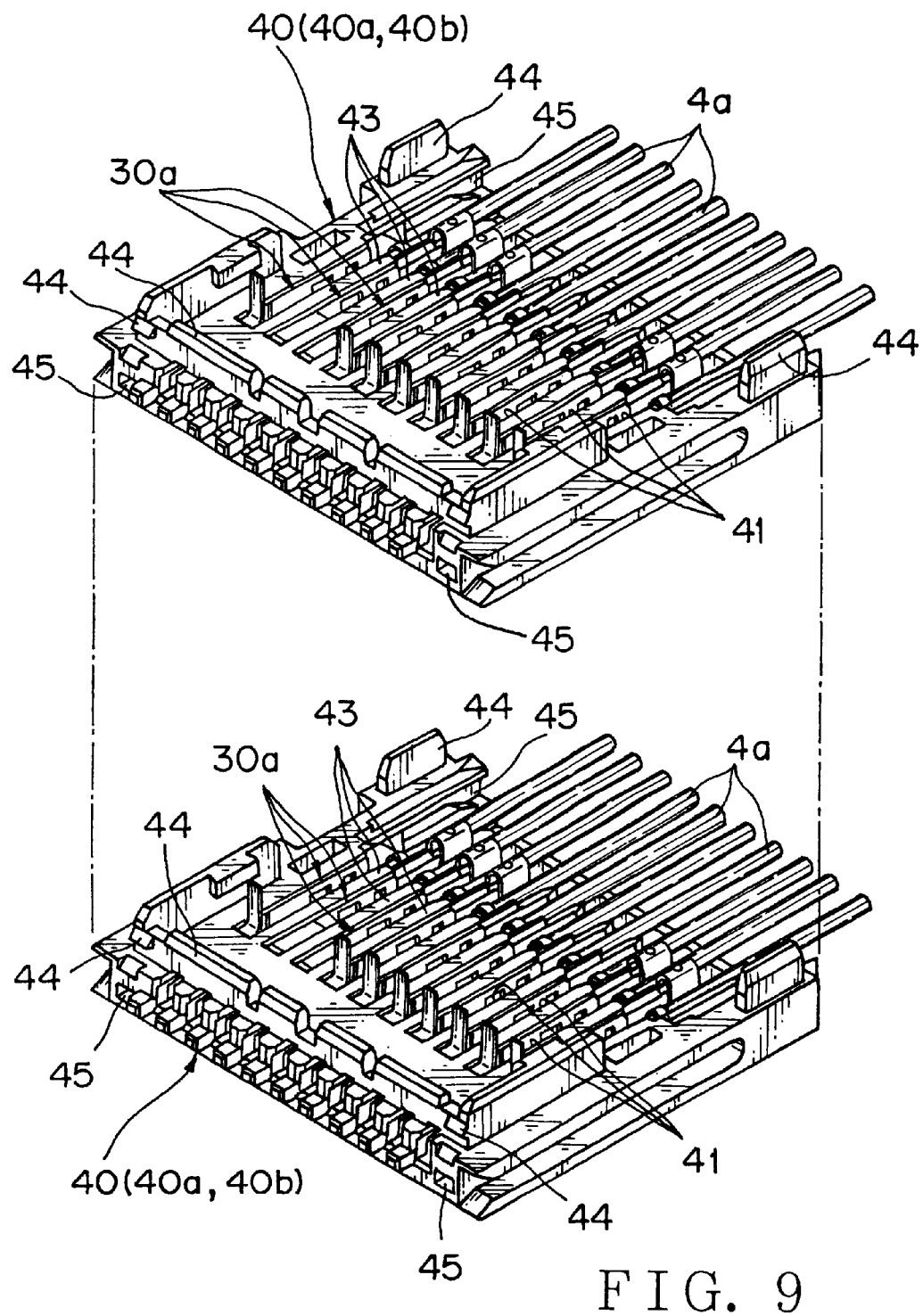
FIG. 9 is a perspective view showing the terminal fitting housings of FIG. 8 layered with a space therebetween.
Figure 10:
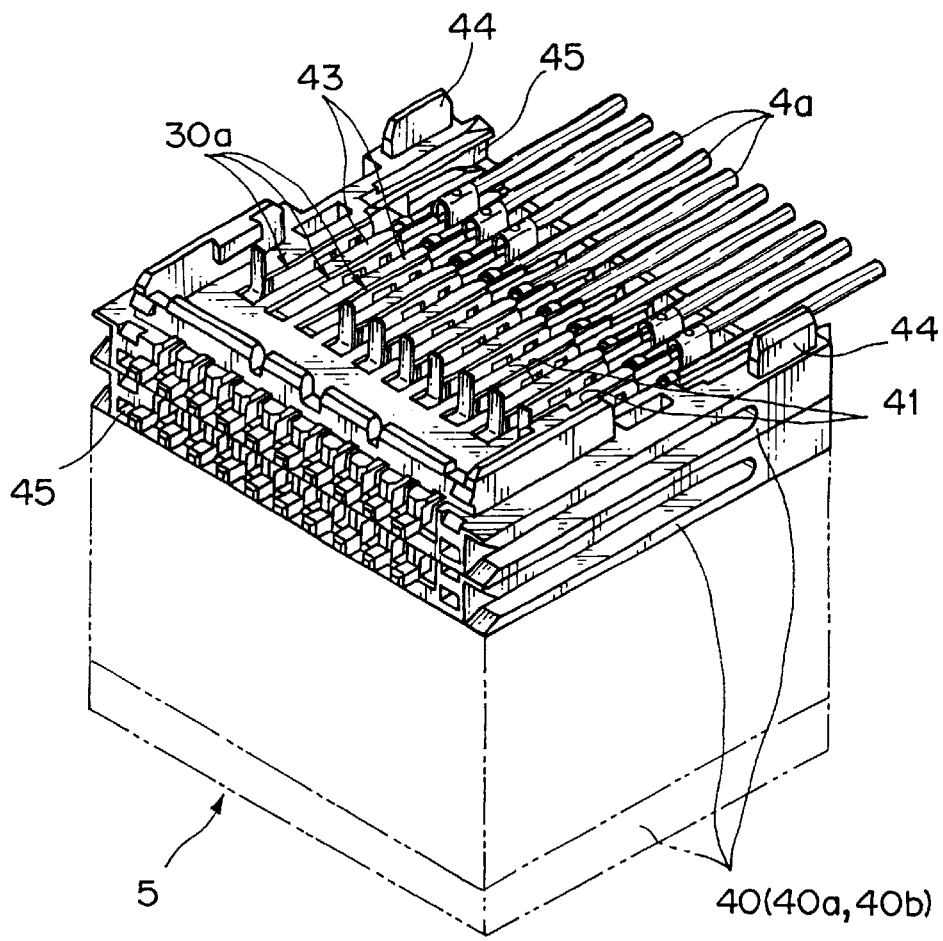
FIG. 10 is a perspective view showing a connector defined by securing the terminal fitting housings of FIG. 8 to one another.

A plurality of the terminal fitting housings 40a, each of which has received the press-fit terminals 30a in the terminal accommodation chambers 41 (see FIG. 7), are layered with the main bodies being parallel to one another to define the connector 5 as illustrated in FIG. 10. At that time, as illustrated in FIG. 8, the electrical cable 4a is fitted to each press-fit terminal 30a secured in the housing 40a. Then, as illustrated in FIG. 9, the terminal fitting housings 40a, each of which has received the electrical cable 4a, are layered.

Each terminal fitting housing 40a has a plurality of lock projections 44 and locking recesses 45 for securing them to one another when layered. Furthermore, the terminal fitting housing 40a has a plurality of openings (not shown), each receiving the contact piece 37 of a lower one of press-fit terminals 30a so that the contact piece 37 can pass through the opening 36 of an upper one of press-fit terminals 30a.

Since the press-fit terminals 50a, 50b for a junction box have the same configuration as each other, only the press-fit terminal 50a will be representatively discussed hereinafter. The press-fit terminal 50a is formed from a conductor plate by a bending work. The press-fit terminal 50a, as illustrated in FIG. 11, has a flat bottom wall 55 on which the electrical cable 4a is disposed, an electrical cable connection portion 51, and an electrical contact piece 52.

The electrical contact piece 52 is received in an electrical cable accommodation chamber 61. The electrical cable connection portion 51 has two pairs of opposing crimping pieces 53a, 53b and three pairs of opposing press fitting blades 54a, 54b, 54c. The crimping pieces 53a, 53b and the press fitting blades 54a, 54b, 54c are vertically extending relative to the bottom wall 55.

The crimping pieces 53a, 53b are bent to hold the electrical cable 4a disposed on the bottom wall 35. The press fitting blades 54a, 54b, 54c receive the electrical cable 4a which is received between each pair of the blades. Thereby, the blades cut into the sheath of the electrical cable 4a to contact the wire core to electrically connect to the electrical cable 4a. That is, the press-fitting of the blades with the electrical cable 4a is completed.

The electrical contact piece 52 has a contact bar 56 along aside edge of the bottom wall 55. The contact bar 56 is a rectangular hollow piece. The electrical contact piece 52 is disposed such that the hollow of the contact bar 56 communicates with a through hole described later of the terminal fitting plate 60a. Through the hollow of the contact bar 56, there is inserted a joint bar 80 illustrated in FIG. 12 for electrical connection thereof. The contact bar 56 has a pair of resilient contact pieces 57 for press-contacting the joint bar 80 thereto.

The joint bar 80 is inserted into the hollows of the contact bars 56 after the terminal fitting plates 60a have been layered. Thus, the electrical contact pieces 52 allow electrical connection of the terminals between the terminal fitting plates 60a to one another.

A press-fit terminal 50a used in a junction-box is forced into one of the electrical cable accommodation chambers 61 of the terminal fitting plate 60a. Thereby, the press-fit terminal 50a is held by the terminal fitting plate 60a. The joint bar 80 is substantially a flat bar made of a conductor metal or the like.

The terminal fitting plates 60a, 60b have the same configuration as each other. Thus, only the terminal fitting plate 60a will be representatively discussed hereinafter. The terminal fitting plate 60a is made of an insulating synthetic resin material or the like. The terminal fitting plate 60a, as illustrated in FIGS. 13 to 15, has a rectangular plate-like main body 62, a plurality of partitions 63 rising from the main body 62, a plurality of electrical cable accommodation chambers 61, a plurality of receiving recesses 64, and through openings (not shown).

The partitions 63 are arranged in parallel to one another with a space therebetween. The space between two adjacent partitions 63 defines the electrical cable accommodation chamber 61. The recess 64 receives the contact bar 56 of the press-fit terminals 50a used in the junction-box.

The receiving recess 64 is defined to provide a wider distance between the two adjacent partitions 63. There are provided a plurality of the receiving recesses 64 along a longitudinal direction of the electrical cable accommodation chambers 61. A through hole is provided for each receiving recess 64. The hole passes through the main body 62.

The terminal fitting plate 60a, as illustrated in FIGS. 13, 14, receives the press-fit terminals 50a in the electrical cable accommodation chambers 61 and the receiving recesses 64. Then, the plate-like main bodies 62 are layered in parallel. The joint bars 80 are inserted into the associated through holes and the hollows of the contact bars 56, so that the terminal fitting plates 60a, as illustrated in FIG. 15, define a power distribution line unit 6.

At the same time, the press-fit terminals 50a each are connected to the electrical cable 4a. The terminal fitting plate 60a has a plurality of lock projections (not shown) and locking holes 66 engageable with the lock projections. The engagement of the lock projections with the locking holes 66 secures the terminal fitting plates 60a to each other.

The wiring harness 1 is completed by layering the terminal fitting housings 40a or 40b or the terminal fitting plates 60a or 60b, which are consisting of the sub-harnesses 10a, 10b, 10c, 20a, or 20b, to secure them to each other according to a predetermined pattern.

In the terminal fitting housings 40a, 40b which have been layered to be secured to each other, the contact pieces 37 electrically connect the in-joint-connector-disposed press-fit terminals 30a, 30b held by different terminal fitting housings 40a, 40b.

In terminal fitting plates 60a, 60b which have been layered to be secured to each other, the joint bars 80 electrically connect the in-junction-box-disposed press-fit terminals 50a, 50b held by different terminal fitting plates 60a, 60b to each other. The mutual connection of the different press-fit terminals 50a, 50b results in mutual electrical connection of the electrical cables 4a, 4b fitted with the different terminals 50a, 50b.

That is, in the wiring harness 1, a connection portion for electrically connecting the electrical cables 4a, 4b to each other is defined by the layering of the terminal fitting housings 40a, 40b or the terminal fitting plates 60a, 60b and by the connection of the terminals 30a, 30b, 50a, 50b through the joint bars 80.

Next, referring to FIGS. 21 to 27, manufacturing steps of the wiring harness 1 will be discussed. For assembling the wiring harness 1, first, a sub-harness assembling step S1 of FIG. 21 assembles the sub-harnesses 10a, 10b, 10c, and a second sub-harness assembling step S2 assembles the sub-harnesses 20a, 20b.

Figure 22:
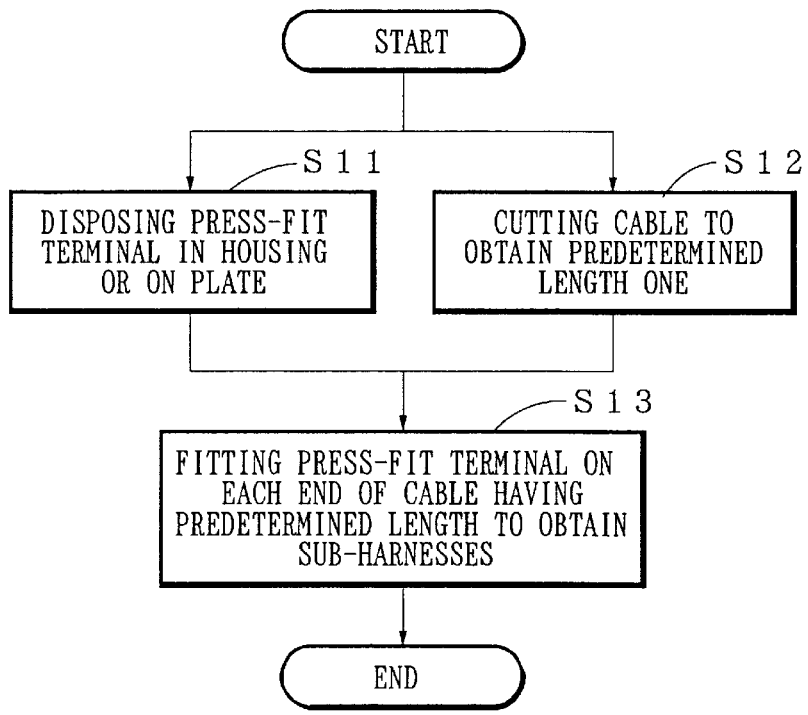
FIG. 22 is a flow chart showing a first sub-harness assembling step of the manufacturing method of the wiring harness shown in FIG. 21.

In the first sub-harness assembling step, step S11 of FIG. 22 forces the in-joint-connector-disposed press-fit terminals 30a into the terminal accommodation chambers 41 of the terminal fitting housing 40a. Furthermore, the in-junction-box disposed press-fit terminals 50a each are forced into the electrical cable accommodation chamber 61 and the receiving recess 64 of the terminal fitting plate 60a.

Step S12 of FIG. 22 cuts an electrical cable fed from a cable reel to obtain the electrical cable 4a having a predetermined length.

Figure 25A:
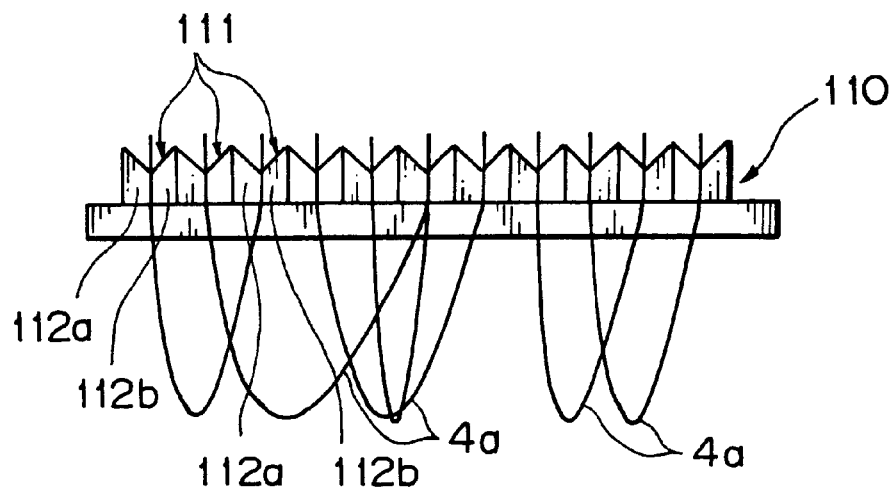
FIGS. 25A and 25B each are a view showing an assembling step of a sub-harness of FIG. 22, the sub-harness having a press-fit terminal at each end thereof.

Each end of the thus obtained electrical cable 4a, as illustrated in FIG. 25A, is clamped by a cable clip 111 of a holding bar 110. The holding bar 110 has a row of the cable clips 111. Each electrical cable clip 111 has a pair of pinching pieces 112a, 112b for holding the electrical cable 4.

Figure 25B:
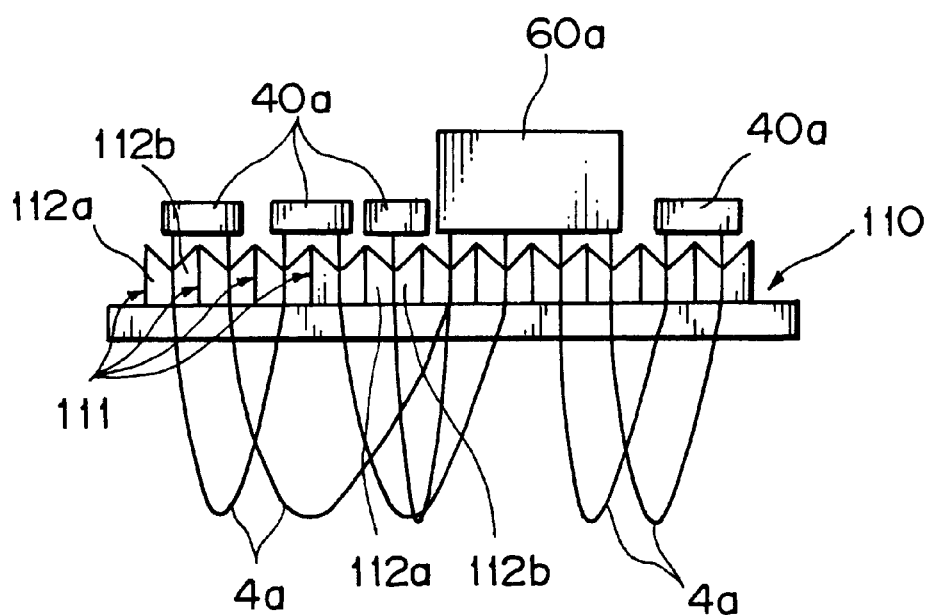

Then, as illustrated in FIG. 25B, step S13 fits the press-fit terminal 30a or 50a held by the terminal fitting housing 40a or the terminal fitting plate 60a to each end of the electrical cable 4a according to a predetermined pattern. Through steps S11 to S13, the sub-harness 10a, 10b, or 10c is obtained.

In the second sub-harness assembling step, step S21 of FIG. 23 forces the in-junction-box disposed press-fit terminal 30b into the terminal accommodation chamber 41 of the terminal fitting housing 40b. The in-junction-box disposed press-fit terminal 50b is forced into the electrical cable accommodation chamber 61 and the related receiving recess 64 of the terminal fitting plate 60b.

Step S22 of FIG. 22 cuts an electrical cable fed from a cable reel to obtain the electrical cable 4b having a predetermined length.

Figure 26A:
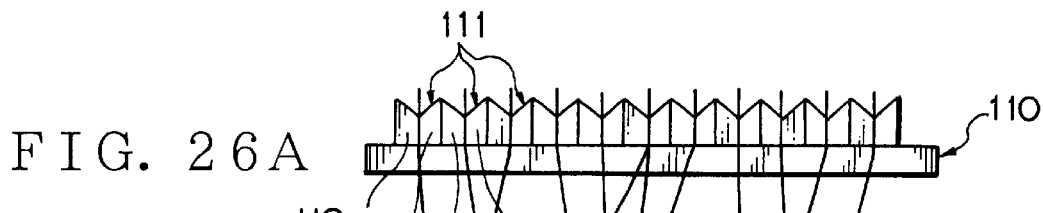
FIGS. 26A, 26B, 26C and 26D each are a view showing an assembling step of a sub-harness of FIG. 23, the sub-harness having a press-fit terminal at one end and a crimp terminal at the other end.

Each end of the thus obtained electrical cable 4a, as illustrated in FIG. 26A, is clamped by a cable clip 111 of a holding bar 110. The holding bar 110 used in this step is the same as that of the first sub-harness assembling step. Thus, the holding bar is provided with the same reference numerals and will not be discussed again.

Figure 26B:
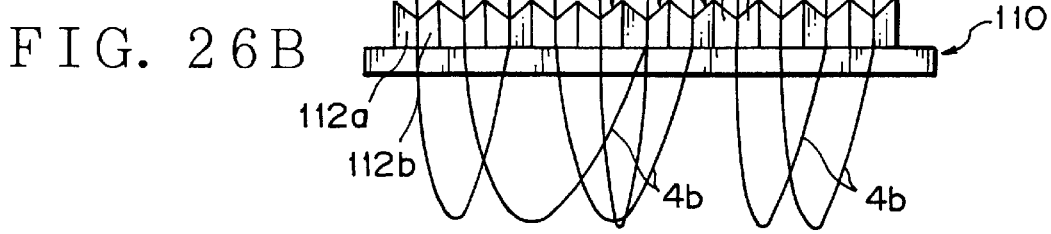

Then, as illustrated in FIG. 26B, step S23 fits the press-fit terminal 90 to a second end of the electrical cable 4b held by the cable clip 111 of the holding bar 110.

Figure 26C:
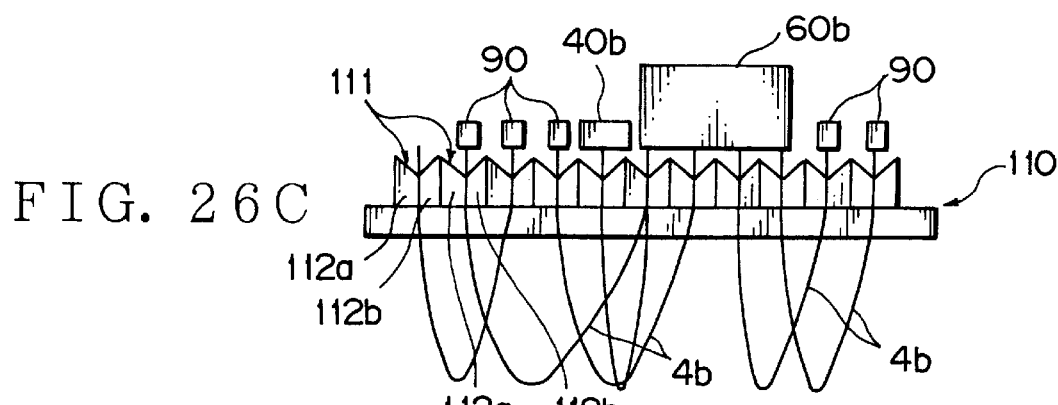

Then, as illustrated in FIG. 26C, step S24 fits the press-fit terminal 30b or 50b held by the terminal fitting housing 40b or the terminal fitting plate 60b to a first end of the electrical cable 4b retained by the holding bar 110 according to a predetermined pattern.

Figure 26D:
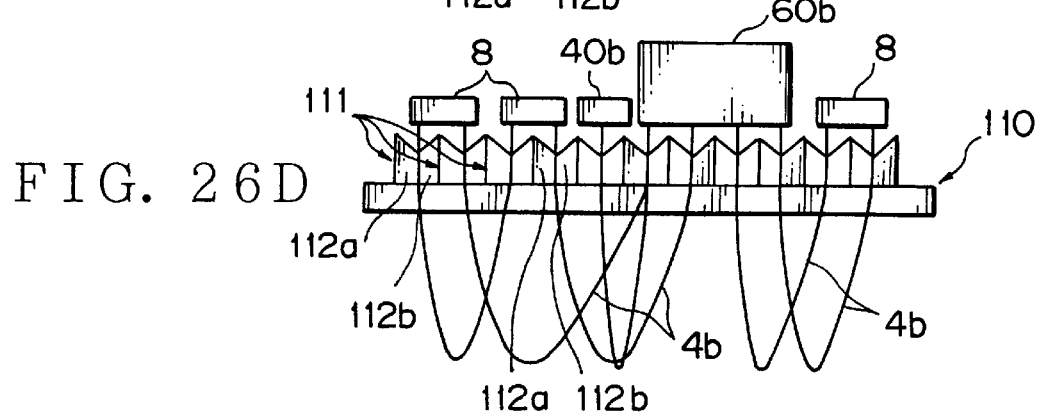

A next step 25, as illustrated in FIG. 26D, inserts the press-crimped terminal 90 into the terminal accommodation chamber 101, so that the second end of the electrical cable 4b is secured to the connector housing 100. Through steps S21 to S25, the sub-harness 20a or 20b is obtained.

Figure 21:
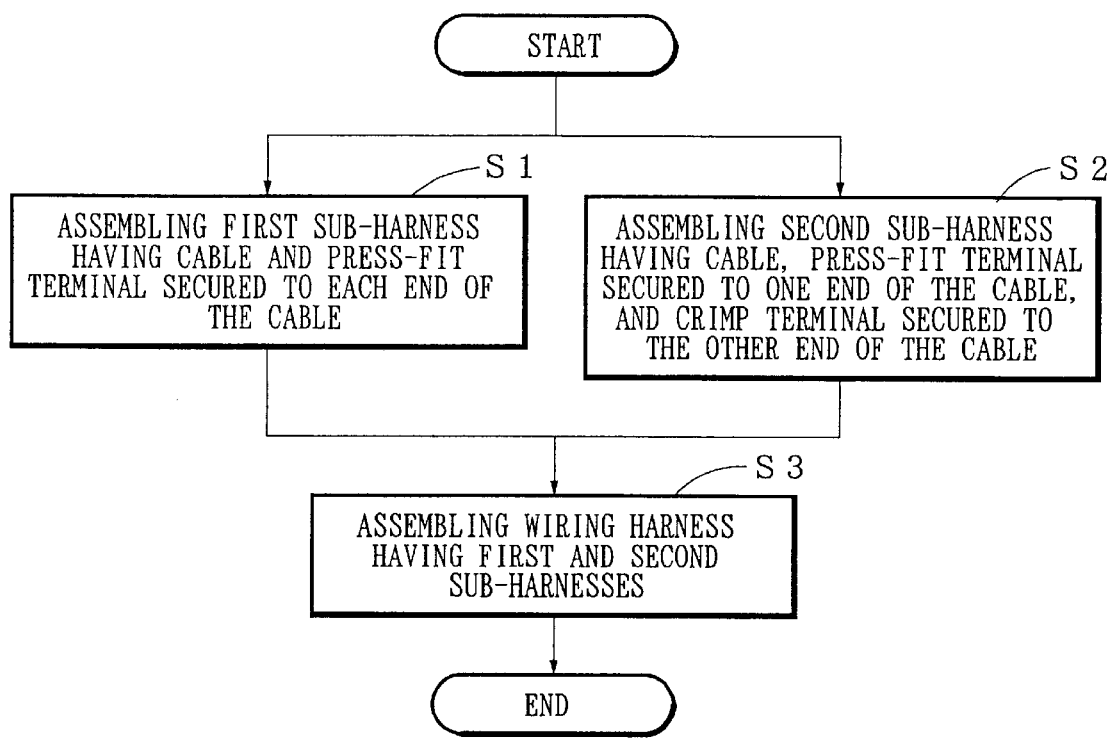
FIG. 21 is a flow chart showing steps of a manufacturing method of the wiring harness shown in FIG. 1.

The first sub-harness assembling step assembles the sub-harness 10a, 10b, or 10c, and the second sub-harness assembling step assembles the sub-harness 20a or 20b. Then, the wiring harness assembling step S3 of FIG. 21 is carried out.

Figure 27:
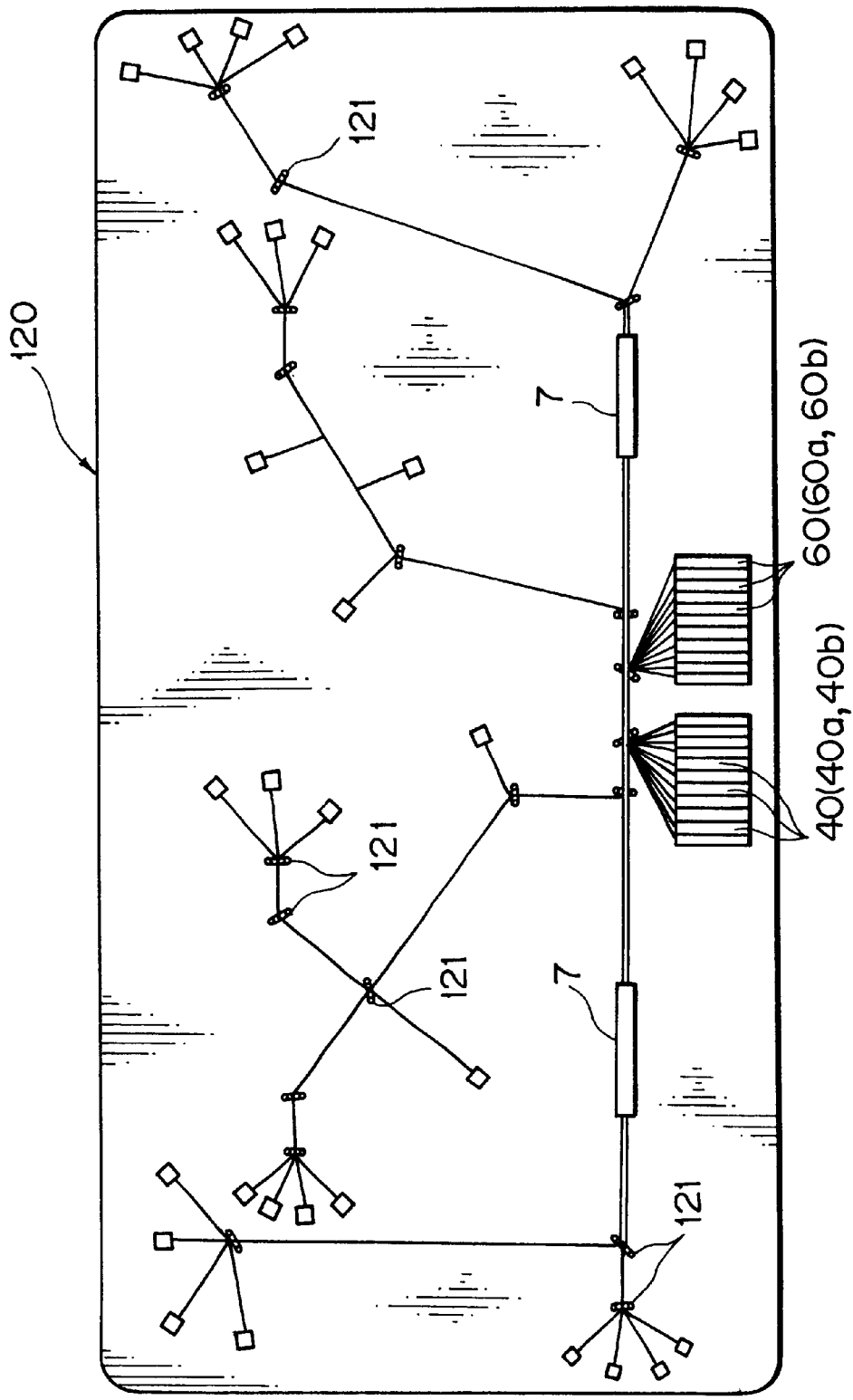
FIG. 27 is a plan view showing a wiring harness assembling step of FIG. 24, in which a wiring board is used.

In the wiring harness assembling step, the sub-harness 10a, 10b, 10c, 20a, or 20b is arranged on a wiring board 120 illustrated in FIG. 27. The wiring board 120 is a plate movable along a rail on a floor of a factory. The wiring board 120 may be mounted on an automatically running bogie along a predetermined way.

On the wiring board 120, there is pictured a wiring arrangement pattern for arranging the electrical cables 4, the connectors 8, and other additional fittings including the protectors 7. The wiring board 120 has a plurality of wiring pins 121 supporting the sub-harnesses 10a, 10b, 10c, 20a, or 20b according to the wiring arrangement pattern.

Referring to FIG. 24, in step S31, a plurality of the plate-like main bodies 42 of the terminal fitting housings 40a or 40b are disposed in parallel to one another, and a plurality of the plate-like main bodies 62 of the terminal fitting plates 60a, 60b are disposed in parallel to one another, as illustrated in FIG. 27.

A next step S32 disposes the terminal fitting housings 40a or 40b close to each other and engages the lock projections 44 with the locking recesses 45. Thus, the terminal fitting housings 40a or 40b are secured to each other to obtain the connector 5.

A next step S33 disposes the terminal fitting plates 60a or 60b close to each other and engages the lock projection with the locking hole 66 to secure the plates 60a or 60b to each other. Then, the joint bar 80 is inserted into the through holes and the hollows of the contact bars 56 of the press-fit terminals 50a, or 50b to obtain the power distribution line unit 6. Note that steps S32 and S33 correspond to the tenth step described in the invention summary.

Then, in step S34, other parts such as the protectors 7 are incorporated to obtain the wiring harness 1. Finally, an appearance inspection and an electrical continuity check are provided for the wiring harness 1 on the wiring board 120.

In the wiring harness 1 of the embodiment, the layering of the terminal fitting housings 40a or 40b electrically connects the electrical cables 4a or 4b to each other to define the connection portion. And, the layering of the terminal fitting plates 60a or 60b and the insertion of the joint bars 80 electrically connect the electrical cables 4a or 4b to each other to define the connection portion.

Thus, it is not required to directly connect the wire core of one of the electrical cables 4a, 4b to that of another to define the connection portion. That is, the connection portion is defined without a press-crimping machine and a resistance welding device. Accordingly, in the first and second sub-harness assembling steps, the sub-harnesses 10a, 10b, 10c, 20a, or 20b need not be moved from its production line of the sub-harness to the press-crimping machine and the resistance welding device. This requires no increased production time.

In the manufacturing method of the wiring harness 1 embodying the present invention, the first sub-harness assembling step fits the press-fit terminal 30a or 50a to each end of the electrical cable 4a to obtain the sub-harness 10a, 10b or 10c. This step need not directly connect the electrical cables 4a to each other.

Similarly, the second sub-harness assembling step fits the press-fit terminal 30a or 50a to the first end of the electrical cable 4b and crimps the crimp terminal 90 to the second end of the electrical cable 4b to obtain the sub-harness 20a or 20. This step need not directly connect the electrical cables 4b to each other.

The wiring harness assembling step layers the terminal fitting housings 40a, 40b to obtain the connector 5 and layers the terminal fitting plates 60a, 60b to obtain a power distribution line unit 6. This defines the connection portion to electrically connect the electrical cables 4a, 4b. Thus, the wiring harness assembling step also need not directly connect the electrical cables 4a, 4b to each other, Accordingly, the manufacturing method of the wiring harness 1 embodying the present invention requires neither a press-crimping machine nor a resistance welding device to directly connect the electrical cables 4a or 4b. Thus, the sub-harnesses 10a, 10b, 10c, 20a, or 20b are transferred from production lines for the first and second sub-harness assembling steps directly to a production line for the wiring harness assembling step. This allows an automatic production line of the wiring harness 1, keeping a sufficient productivity.

The embodiment uses the holding bar 110 for assembling the sub-harness 10a, 10b, or 10c as illustrated in FIGS. 25A and 25B. However, the first sub-harness assembling step of the present invention may use a flexible press-fitting machine, for example, disclosed in Japanese Patent Application Laid-open No. H. 7-296933. Note that the sub-harness 10a, 10b, or 10c may have electrical cables 4a crossing one another.

Moreover, the wiring harness 1 according to the present invention may have one or more of electrical cables each having a crimp terminal provided at each end thereof.

What is claimed is:

1. A wiring harness having a plurality of electrical cables and a connection portion electrically connecting one of the electrical cables to another of the electrical cables, the wiring harness comprising:

a plurality of sub-harnesses each having at least one press-fit terminal and an isolator supporting the press-fit terminal, the press-fit terminal being joined to an end of one of the electrical cables, the press-fit terminal capable of being positioned selectively in one of a plurality of terminal receiving recesses aligned with one another on the isolator in a longitudinal direction of the one of electrical cables, and a joint bar for connecting one of the press-fit terminals held by one of the isolators to another of the press-fit terminals held by another of the isolators in a vertical direction relative to the isolators, wherein the isolators of the sub-harnesses are layered and the connection portion includes the joint bar.

2. A wiring harness having a plurality of electrical cables and a connection portion electrically connecting one of the electrical cables to another of the electrical cables, the wiring harness comprising:

a plurality of first sub-harnesses each having a first press-fit terminal joined to each end of a first one of the electrical cables, the first sub-harness having a first isolator holding the first press-fit terminal, the first press-fit terminal capable of being positioned selectively in one of a plurality of terminal receiving recesses aligned with one another on the first isolator in a longitudinal direction of the first one of electrical cables, a plurality of second sub-harnesses each having a second press-fit terminal, a crimp terminal, and a connector housing for accommodating the crimp terminal, and a second isolator supporting the second press-fit terminal, the second press-fit terminal being connected to one end of a second one of the electrical cables, the second press-fit terminal capable of being positioned selectively in one of a plurality of terminal receiving recesses aligned with one another on the second isolator in a longitudinal direction of the second one of electrical cables, the crimp terminal being connected to the other end of the second electrical cable, and a joint bar for connecting one of the press-fit terminals held by one of the first or second isolators to another of the press-fit terminals held by another of the first or second isolators, wherein the first and second isolators are layered and the connection portion includes the joint bar.

3. A wiring harness having a plurality of electrical cables and a connection portion electrically connecting one of the electrical cables to another of the electrical cables, the wiring harness comprising:

a plurality of first sub-harnesses each having a first press-fit terminal joined to each end of one of the electrical cables, the first sub-harness having a first isolator supporting the first press-fit terminal, the first press-fit terminal capable of being positioned selec-tively in one of a plurality of terminal receiving recesses aligned with one another on the isolator in a longitudinal direction of the one of electrical cables, and a joint bar for connecting one of the press-fit terminals held by one of the isolators to another of the press-fit terminals held by another of the isolators, wherein the isolators of the sub-harnesses are layered and the connection portion includes the joint bar.

4. A wiring harness having a plurality of electrical cables and a connection portion electrically connecting one of the electrical cables to another of the electrical cables, the wiring harness comprising:

a plurality of sub-harnesses each having a press-fit terminal, a crimp terminal, a connector housing for accommodating the crimp terminal, and a second isolator holding the press-fit terminal, the press-fit terminal being connected to an end of one of the electrical cables, the press-fit terminal capable of being positioned selectively in one of a plurality of terminal receiving recesses aligned with one another on the isolator in a longitudinal direction of the one of electrical cables, the crimp terminal being connected to the other end of the one of the electrical cables, and a joint bar for connecting one of the press-fit terminals held by one of the isolators to another of the press-fit terminals held by another of the isolators, wherein the isolators of the sub-harnesses are layered and the connection portion includes the joint bar.

5. A manufacturing method of a wiring harness having a plurality of first sub-harnesses, a plurality of second sub-harnesses, and a joint bar, each of the first sub-harnesses having a plurality of first electrical cables, a first press-fit terminal joined to each end of each of the first electrical cables, and a first isolator holding the first press-fit terminals, the first press-fit terminal capable of being positioned selec-tively in one of a plurality of terminal receiving recesses aligned with one another on the first isolator in a longitudinal direction of the first electrical cable, each of the second sub-harnesses having a plurality of second electrical cables, a second press-fit terminal joined to one end of each of the second electrical cables, a crimp terminal joined to the other end of each of the second electrical cables, a connector housing receiving the crimp terminals, and a second isolator holding the second press-fit terminals, the second press-fit terminal capable of being positioned selec-tively in one of a plurality of terminal receiving recesses aligned with one another on the second isola-tor in a longitudinal direction of the second electrical cable, the manufacturing method comprising the steps of:
   a first sub-harness assembling step,
   a second sub-harness assembling step, and
   a wiring harness assembling step, wherein any of the first and second isolators of the first and second sub-harnesses are layered, and the joint bar connects one of the press-fit terminals held by one of the first and second isolators to another of the press-fit ter-minals held by another of the first and second isolators.

6. The method set forth in claim 5, wherein the first sub-harness assembling step includes:
   a first step for holding the first press-fit terminal by the first isolator, a second step for cutting a long electrical cable to obtain the first electrical cable having a predetermined length, and a third step for press-fitting the first press-fit terminal to each end of the first electrical cable.

7. The method set forth in claim 6, wherein the second sub-harness assembling step includes:

a fourth step for holding the second press-fit terminal by the second isolator, a fifth step for cutting a long electrical cable to obtain the second electrical cable having a predetermined length, a sixth step for press-crimping the crimp terminal to the other end of the second the electrical cable, a seventh step for press-fitting the second press-fit terminal to the one end of the second electrical cable, and an eighth step forinserting the crimp terminal into a terminal accommodation chamber of the connector housing.

8. The method set forth in claim 7, the wire harness assembling step includes:

a ninth step for disposing any of the first and second isolators to be parallel to one another with a space therebetween, and a tenth step for layering the parallel disposed isolators to connect one of the press-fit terminals held by one of the first and second isolators to another of the press-fit terminals held by another of the first and second isolators.

* * * * *